(12) United States Patent
Fukuyama et al.

(10) Patent No.: US 7,706,222 B2
(45) Date of Patent: Apr. 27, 2010

(54) DEMODULATOR, DISK DRIVE DEVICE, AND DEMODULATION METHOD

(75) Inventors: Mariko Fukuyama, Tokyo (JP); Tadaaki Nomoto, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 11/741,267

(22) Filed: Apr. 27, 2007

(65) Prior Publication Data

US 2007/0263505 A1 Nov. 15, 2007

(30) Foreign Application Priority Data

May 9, 2006 (JP) ............................. 2006-129920

(51) Int. Cl.
*G11B 20/10* (2006.01)
(52) U.S. Cl. ................................. 369/47.19; 369/47.28
(58) Field of Classification Search .............. 369/47.19, 369/47.27
See application file for complete search history.

(56) References Cited

U.S. PATENT DOCUMENTS 7,333,408 B2 * 2/2008 Sano et al. ............... 369/47.19

FOREIGN PATENT DOCUMENTS

| JP | 2005-222608 | 8/2005 |
|---|---|---|
| JP | 2006-012348 | 1/2006 |
| JP | 2006-031804 | 2/2006 |
| JP | 2006-059390 | 3/2006 |

* cited by examiner

*Primary Examiner*—Thang V Tran
(74) *Attorney, Agent, or Firm*—Oblon, Spivak, McClelland, Maier & Neustadt, L.L.P.

(57) ABSTRACT

A demodulator for demodulating an input signal including a predetermined modulated signal includes a multiplication fundamental wave generator for outputting a multiplication fundamental wave for the predetermined modulated signal, a calculator for multiplying the multiplication fundamental wave by the input signal and for integrating the multiplication result, a demodulated signal generator for generating a demodulated signal of the modulated signal using the output from the calculator, a phase determiner for determining a cross-phase state of the input signal and the multiplication fundamental wave on the basis of a balance of levels of a plurality of integrated values, obtained as the integration result, for an interval containing the modulated signal in the input signal, and a phase adjuster for adjusting a phase of the multiplication fundamental wave to be supplied to the calculator on the basis of the determination result of the phase determiner.

10 Claims, 19 Drawing Sheets

FIG. 4

| ADIP UNIT NUMBER | ADIP UNIT TYPE |
|---|---|
| 0 | MONOTONE |
| 1 | sync_0 |
| 2 | MONOTONE |
| 3 | sync_1 |
| 4 | MONOTONE |
| 5 | sync_2 |
| 6 | MONOTONE |
| 7 | sync_3 |
| 8 | REFERENCE |
| 9 | data[0] |
| 10 | data[1] |
| 11 | data[2] |
| 12 | data[3] |
| 13 | REFERENCE |
| 14 | data[4] |
| 15 | data[5] |
| 16 | data[6] |
| 17 | data[7] |
| 18 | REFERENCE |
| ⋮ | ⋮ |
| 82 | data[59] |

Rows 13–17: REPEATED

FIG. 15A — PHASE LEAD OF MULTIPLICATION FUNDAMENTAL WAVE BW → (+)

FIG. 15B — OPTIMUM PHASE STATE → (0)

FIG. 15C — PHASE DELAY OF MULTIPLICATION FUNDAMENTAL WAVE BW → (−)

DEMODULATOR, DISK DRIVE DEVICE, AND DEMODULATION METHOD

CROSS REFERENCES TO RELATED APPLICATIONS

The present invention contains subject matter related to Japanese Patent Application JP 2006-129920 filed in the Japanese Patent Office on May 9, 2006, the entire contents of which are incorporated herein by reference.

BACKGROUND OF THE INVENTION

1. Field of the Invention

The present invention relates to a demodulator for demodulating signals including a predetermined modulated signal, a disk drive device including the demodulator, and a demodulation method. For example, the present invention is suitable for demodulation of a minimum shift keying (MSK) modulated signal used as the predetermined modulated signal.

2. Description of the Related Art

Demodulation techniques are disclosed in Japanese Unexamined Patent Application Publication Nos. 11-306686, 2002-74660, 2005-222608, and 2006-12348.

In data recording techniques for recording and reproducing digital data, optical disks (including magneto-optical disks), such as a compact disk (CD), a mini-disk (MD), a digital versatile disk (DVD), are used as recording media.

The optical disks include read-only types, such as, for example, a CD, a CD-ROM (compact disk-read only memory), and a DVD-ROM, and user-data-recordable types, such as an MD, a CD-R (compact disk recordable), a CD-RW (compact disk-rewritable), a DVD-R (DVD recordable), a DVD-RW, DVD+RW, and a DVD-RAM. In the recordable types, a magneto-optical recording method, a phase change recording method, a pigment-layer change recording method, and other recording methods are utilized to record data. The pigment-layer change recording method, also referred to as write-once recording method, is considered suitable for use in data storage because it permits data recording only once. On the other hand, the magneto-optical recording method and the phase change recording method permit data rewriting, thereby finding many applications in the recording of various contents including music, videos, games, and application programs.

Furthermore, recently developed high-density optical disks, called Blu-Ray Discs®, offer an extremely high data storage capacity.

Guides for tracking a data track are required to record data onto recordable disks that work in the magneto-optical recording method, the pigment-layer change recording method, the phase change recording method, or the like. To this end, a groove is formed as a pre-groove, and the groove or a land (an elevated land portion between grooves in cross section) is tracked in data recording.

Address information needs to be recorded to record data at a predetermined location on a data track. The address information may be sometimes recorded by wobbling the groove.

More specifically, the track for recording data is formed as, for example, a pre-groove, and the sidewall of the pre-groove is wobbled in accordance with the address information.

With this configuration, addresses can be read from the wobbling information obtained as reflected laser information during recording and reproducing operations. Data is thus recorded to or reproduced from a target location without the need for previously forming pit data representing the address on tracks, for example.

The address information arranged as the wobbling groove eliminates the need for arranging address areas discretely on the track and recording an address as pit data. As the address area becomes unnecessary, an amount of actual recordable data is increased accordingly.

Absolute time information (address) represented by the wobbled groove is referred to as the absolute time in pre-groove (ATIP), or the address in pregroove (ADIP).

In the case of Blu-Ray Disks®, the groove is wobbled in accordance with a modulated waveform that is modulated in a combination of an MSK modulation and a saw tooth wobble (STW) modulation.

The ADIP information, formed using the MSK modulation, the STW modulation, or a combination of both modulations, will be discussed in more detail later. The MSK modulation is one of continuous phase frequency shift keying (FSK) modulations with a modulation index of 0.5.

In the STW modulation, a second harmonic of a wobble fundamental wave is added to or subtracted from the wobble fundamental wave so that a modulated wave, such as a sawtooth wave, is generated.

A disk drive device for Blu-Ray Disks®, for example, contains an MSK demodulator and an STW demodulator to reproduce the ADIP information.

In particular, techniques for demodulating MSK/STW modulated signals, and decoding the ADIP information are disclosed in Japanese Unexamined Patent Application Publication Nos. 11-306686, 2002-74660, 2005-222608, and 2006-12348.

SUMMARY OF THE INVENTION

The amplitude of MSK modulated and STW modulated wobble signals fluctuates due to crosstalk between adjacent tracks on a disk, an output amplitude difference between the wobble signals before and after recording, and variations in the quality of the disk.

Use of an automatic gain control (AGC) circuit and limiting of the amplitude of the wobble signal are contemplated to avoid variations in the amplitude of the wobble signal, as disclosed, for example, in Japanese Unexamined Patent Application Publication Nos. 11-306686 and 2002-74660. The wobble signal is subject to disturbance not only in amplitude but also in time axis (phase).

In MSK modulation and STW modulation, multiplication fundamental wave is generated as a sine wave or a cosine wave having the same frequency as a wobble fundamental wave. The multiplication fundamental wave is multiplied in accordance with the input wobble signal. The multiplication results are accumulated, and positive or negative of the accumulated value is determined, thereby a demodulated signal is obtained.

The effect of the disturbance of phase appears as a phase shift between the wobble signal and the multiplication fundamental wave to be multiplied. An appropriate accumulated value of the multiplied values may not be obtained due to the phase shift and suitable demodulation may not be performed.

A reference signal is used as an STW modulated signal to avoid the effect of the disturbance of phase. An STW demodulation system detects the phase shift utilizing the reference signal and adjusts the phase of the multiplication fundamental wave.

Regarding MSK demodulation, a technique for adjusting the phase of the multiplication fundamental wave using phase information obtained in the STW demodulation system is described in Japanese Unexamined Patent Application Publication No. 2005-222608 as a method for avoiding the effect of the disturbance of phase. However, in this case, the phase of the multiplication fundamental wave cannot be adjusted for areas not containing STW modulated signal as the wobbling groove. For example, the phase can be adjusted in a case where both MSK modulated signal and STW modulated signal are contained as the wobbling groove on all areas on the disk. However, when only the MSK signal is contained as the wobbling groove in an area on the disk, the phase information cannot be obtained from the STW demodulation system.

In addition, correlation between phase changes of the STW modulated signal and of the MSK modulated signal is not ensured in all of the media.

For this reason, adjusting, in the MSK demodulation system, the phase of the multiplication fundamental wave using the phase information obtained in the STW demodulation system is not always effective.

As described in Japanese Unexamined Patent Application Publication No. 2006-12348, the following method is also considered. An MSK demodulation system includes a plurality of multiplication integrators. Each multiplication integrator performs operations in different cross-phase state. A system in the optimum cross-phase state is determined on the basis of the operation results. The phase of the multiplication fundamental wave is adjusted so that the determined cross-phase state is provided to a particular arithmetic unit. In this case, although the phase adjustment can be performed in the MSK demodulation system alone, a plurality of (at least three systems) multiplication integrators is needed, which undesirably increases circuit size considerably.

Embodiments of the present invention are made in view of such disadvantages, and realize stable demodulation operation compatible with the phase variation due to disturbance without considerably increasing size of a circuit.

According to an embodiment of the present invention, a demodulator for demodulating an input signal including a predetermined modulated signal includes a multiplication fundamental wave generator for outputting a multiplication fundamental wave for the predetermined modulated signal, a calculator for multiplying the multiplication fundamental wave by the input signal and for integrating the multiplication result, a demodulated signal generator for generating a demodulated signal of the modulated signal using the output from the calculator, a phase determiner for determining a cross-phase state of the input signal and the multiplication fundamental wave on the basis of a balance of levels of a plurality of integrated values, obtained as the integration result, for an interval containing the modulated signal in the input signal, and a phase adjuster for adjusting a phase of the multiplication fundamental wave to be supplied to the calculator on the basis of the determination result of the phase determiner.

The phase adjuster may adjust the phase of the multiplication fundamental wave on the basis of the determination result of the phase determiner so that the cross-phase state of the input signal and the multiplication fundamental wave to be multiplied by the calculator becomes optimum.

The phase determiner may increment and decrement, for each interval containing the modulated signal, a counted value of an up/down counter on the basis of a direction of the phase shift determined from the level balance, and may generate a phase adjustment value, as the determination result of the cross-phase state, using the counted value of the up/down counter obtained after counting is performed a predetermined number of times.

The phase determiner may be supplied with a modulation interval signal indicating an interval containing the modulated signal. The phase determiner may determine the direction of phase shift on the basis of the balance of levels of the plurality of integrated values only regarding the interval indicated by the modulation interval signal.

The predetermined modulated signal may be a signal modulated according to a minimum shift keying modulation method.

According to another embodiment of the present invention, a disk drive device includes a reader for reading a wobble signal including a predetermined modulated signal recorded on a disk recording medium as a wobbling groove, a multiplication fundamental wave generator for outputting a multiplication fundamental wave for the predetermined modulated signal, a calculator for multiplying the multiplication fundamental wave by the input signal and for integrating the multiplication result, a demodulated signal generator for generating a demodulated signal of the modulated signal using the output from the calculator, a phase determiner for determining a cross-phase state of the input signal and the multiplication fundamental wave on the basis of a balance of levels of a plurality of integrated values, obtained as the integration result, for an interval containing the modulated signal in the wobble signal, a phase adjuster for adjusting a phase of the multiplication fundamental wave to be supplied to the calculator on the basis of the determination result of the phase determiner, and a decoder for decoding the demodulated signal provided by the demodulated signal generator and for obtaining information recorded as the wobbling groove.

The phase adjuster may adjust the phase of the multiplication fundamental wave so that the cross-phase state of the input signal and the multiplication fundamental wave to be multiplied by the calculator becomes optimum.

The decoder may obtain address information on the disk recording medium as the information recorded as the wobbling groove.

According to still another embodiment of the present invention, a demodulation method for a demodulator for demodulating an input signal including a predetermined modulated signal includes the steps of multiplying the multiplication fundamental wave by the input signal and integrating the multiplication result, generating a demodulated signal of the modulated signal using the output of the multiplying and integrating step, determining a cross-phase state of the input signal and the multiplication fundamental wave on the basis of a balance of levels of a plurality of integrated values, obtained as the integration result, for an interval containing the modulated signal in the input signal, and adjusting a phase of the multiplication fundamental wave to be multiplied on the basis of the determination result of the phase determining step.

According to a further embodiment of the present invention, a demodulation method for a demodulator for demodulating an input signal including a predetermined modulated signal includes the steps of multiplying the multiplication fundamental wave by the input signal and integrating the multiplication result, generating a demodulated signal of the modulated signal using the output of the multiplying and integrating step, determining a cross-phase state of the input signal and the multiplication fundamental wave on the basis of a balance of levels of a plurality of integrated values, obtained as the integration result, for an interval containing the modulated signal in the input signal, and adjusting a phase of the multiplication fundamental wave on the basis of the determination result of the phase determining step so that the cross-phase state of the input signal and the multiplication fundamental wave to be multiplied in the multiplying and integrating step becomes optimum.

In the embodiments of the present invention, the multiplication fundamental wave and the input signal (the wobble signal) are multiplied during the demodulation of the predetermined modulated signal, e.g., the MSK modulated signal, to adjust the phase of the multiplication fundamental wave so that the cross-phase state of the multiplication fundamental wave and the input signal does not become out of phase. Accordingly, the cross-phase state of the input signal and the multiplication fundamental wave is determined on the basis of the balance of the levels of the plurality of integrated values, obtained as the integration result, for the intervals containing the modulated signal in the input signal. The plurality of integrated values, obtained as the integration result, for the intervals containing the modulated signal may be integrated values during two successive wobble durations in case of the MSK signal. Levels of these integrated values become equal if the cross-phase state is appropriate, whereas the levels differ if the cross-phase state is not appropriate.

According to the embodiments of the present invention, the multiplication fundamental wave and the input signal (the wobble signal) are multiplied in a demodulation process performed on the predetermined modulated signal (particularly, the MSK modulated signal). At this time, the phase of the multiplication fundamental wave is automatically adjusted so that the cross-phase state of the multiplication fundamental wave and the input wave becomes in phase. The cross-phase state has to be determined for the automatic adjustment. Thus, the cross-phase state of the input signal and the multiplication fundamental wave is determined on the basis of the balance of the levels of the plurality of integrated values, obtained as the integration result, for the intervals containing the modulated signal in the input signal. For example, the phase of the multiplication fundamental wave is adjusted on the basis of this determination, thereby adjusting the cross-phase state. Accordingly, the cross-phase state in the calculator is brought to the appropriate state.

The cross-phase state of the input signal and the multiplication signal is determined on the basis of the balance of the levels of the plurality of integrated values. This does not result in complicated circuit configurations unlike the case where the correct direction of the phase adjustment is determined using a plurality of calculators, for example.

Accordingly, the demodulator and the demodulation methods according to embodiments of the present invention can realize reliable demodulation without complicating the demodulation circuit configuration even if the phase of the input signal (the wobble signal) varies due to the disturbance, such as crosstalk between adjacent tracks, a drop in reflectivity subsequent to recording, and disk skew.

Improvement in the demodulation performance decreases address errors, thus improving recording/reproduction performance in the disk drive device according to an embodiment of the present invention. Accordingly, stable recording/reproduction can be performed on a read and write media having large variations in physical characteristics and recording/reproduction characteristics, for example.

Since an increase in the demodulation performance for MSK modulation by automatic phase adjustment allows wobble address demodulation performance to be maintained regarding the variations in characteristics of pickups, the production yield of the pickups can be improved.

BRIEF DESCRIPTION OF THE DRAWINGS

FIG. 4 is an explanatory diagram of ADIP information formed by an ADIP unit;

DESCRIPTION OF THE PREFERRED EMBODIMENTS

Embodiments of the present invention will be described below in the following order.

1. MSK modulation, STW modulation, and ADIP

2. Configuration of a disk drive device

3. Configuration of an ADIP demodulation system

4. Modifications

1. MSK Modulation, STW Modulation, and ADIP

Figure 1A:
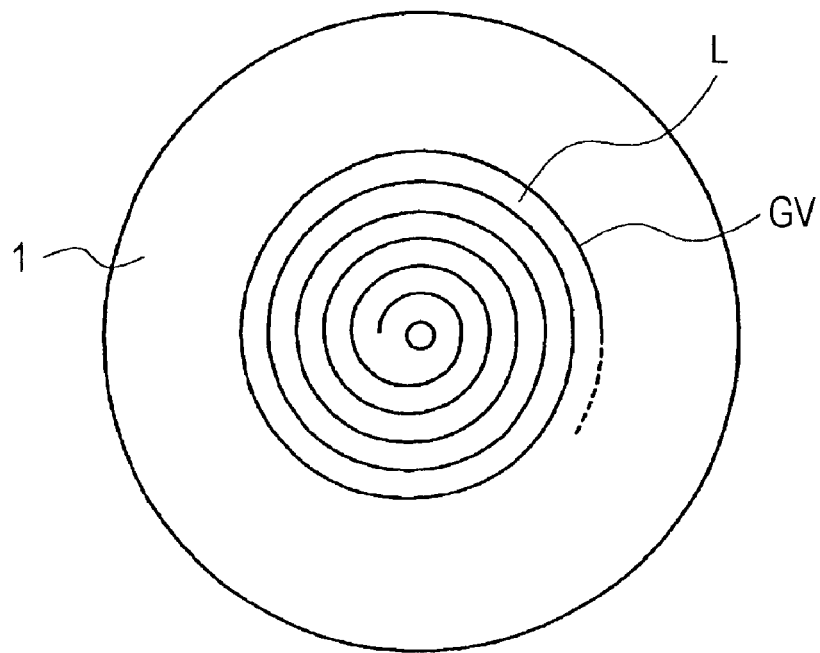
FIGS. 1A and 1B are explanatory diagrams of wobbling grooves of a disk.
Figure 1B:
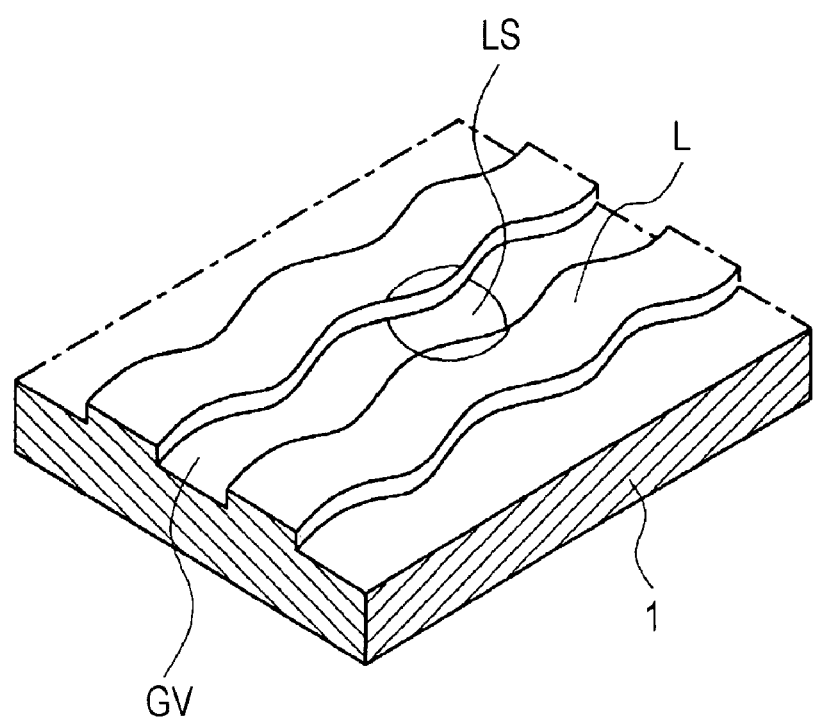

An optical disk 1 for one embodiment of the present invention contains a groove GV serving as a recording track as shown in FIG. 1A. The groove GV spirals from an inner periphery side to an outer periphery side. FIG. 1B is a sectional view illustrating an elevated land L and a groove GV alternately formed in a radial direction of the optical disk 1.

The direction of the spiral of the optical disk 1 shown in FIG. 1A is viewed from a recording surface of the optical disk 1. If the optical disk 1 has a plurality of recording layers, the spiral configuration may be different from layer to layer.

The groove GV of the optical disk 1 wobbles in a tangential direction of the spiral circle as shown in FIG. 1B. The wobbling configuration of the groove GV corresponds to the wobble signal. An optical disk drive detects positions of both edges of the groove GV in a laser beam reflected from a laser spot LS directed on the groove GV. When the laser spot LS is moved along a recording track, the optical disk drive detects a variation component in the edge positions along the disk radial direction to reproduce the wobble signal.

The wobble signal contains modulated address information of a recording track in a recording position (physical address and other additional information). By demodulating the address information from the wobble signal, an optical disk drive can perform address control in the recording and reproduction of data.

Embodiments of the present invention will be described in connection with the optical disk having record grooves. The embodiments of the present invention are applicable to not only the groove record disk, but also to an optical disk of a land record type in which data is recorded on a land. The embodiments of the present invention are also applicable to a land-groove record optical disk.

In the optical disk 1 according to the present embodiment, the address information is modulated in the wobble signal using two modulation methods. One method is an MSK (minimum shift keying) modulation method, and the other is an STW (saw-tooth wobble) modulation method. In the STW modulation, even order harmonic waves are added to a sinusoidal carrier signal, and data is modulated by changing the polarity of each harmonic signal in response to the code of the data.

Figure 3A:
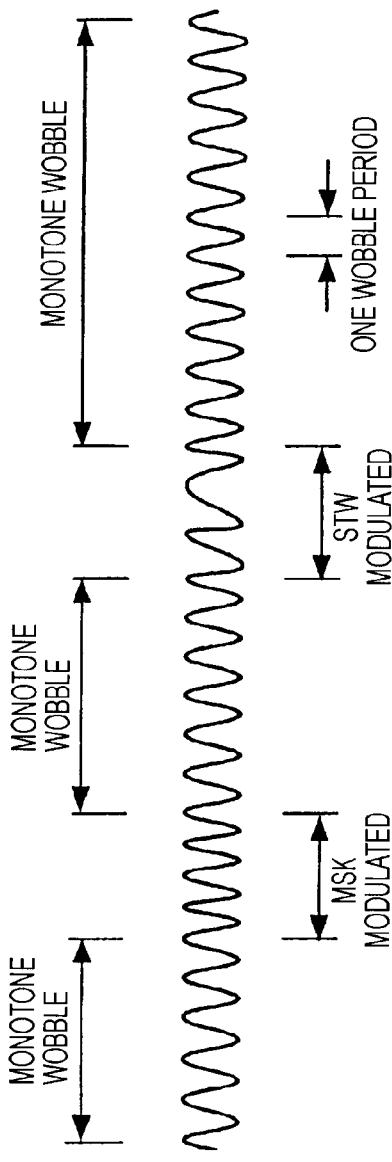
FIGS. 3A and 3B are explanatory diagrams of an ADIP unit.

As shown in FIG. 3A, the optical disk 1 according to the embodiment has a block where a sinusoidal reference carrier signal wave having a predetermined frequency continues during predetermined periods. The wobble signal is generated in the block. The wobble signal contains an MSK modulated area where MSK modulated address information is placed, and an STW modulated area where STW modulated address information is placed. The MSK modulated address information and the STW modulated address information are inserted into different locations in the block. One of two sinusoidal carrier signals used in the MSK modulation and a carrier signal of the STW modulation are referred to as reference carrier signals. In addition, the MSK modulated area and the STW modulated area are arranged in different locations within the block, and a reference carrier signal having at least one period is arranged between the MSK modulated area and the STW modulated area.

An area having no modulated data with a frequency component of the reference carrier signal appearing thereon is referred to a monotone wobble. A sinusoidal signal used as the reference carrier signal is represented by $\cos(\omega t)$. One period of the reference carrier signal is referred to as one wobble period. The frequency of the reference carrier signal remains unchanged from an inner periphery to an outer periphery on the optical disk 1, and is determined relative to a linear velocity at which the laser spot LS moves along a recording track.

The MSK modulation and the STW modulation will be described in more detail. The modulation method of the address information using the MSK modulation will be described first.

The MSK modulation is one of phase continued FSK (frequency shift keying) modulations having a modulation index of 0.5. In the FSK modulation, data is modulated with two carrier signals having a frequency f1 and a frequency f2 set to correspond to the codes of the data to be modulated, namely, "0" and "1". That is, if the data is "0", a sinusoidal wave having the frequency f1 is outputted, while if the data is "1", a sinusoidal wave having the frequency f2 is outputted. In the case of the phase continued FSK modulation, the phases of the two carrier signals continue at a switching timing of the codes of the modulated data.

In the FSK modulation, a modulation index "m" is defined as follows:

$$m=|f1-f2|T$$

where T represents a data transmission rate (1/shortest code length time). When the modulation index "m" is 0.5, the phase continued FSK modulation is referred to as the MSK modulation.

Figure 2A:
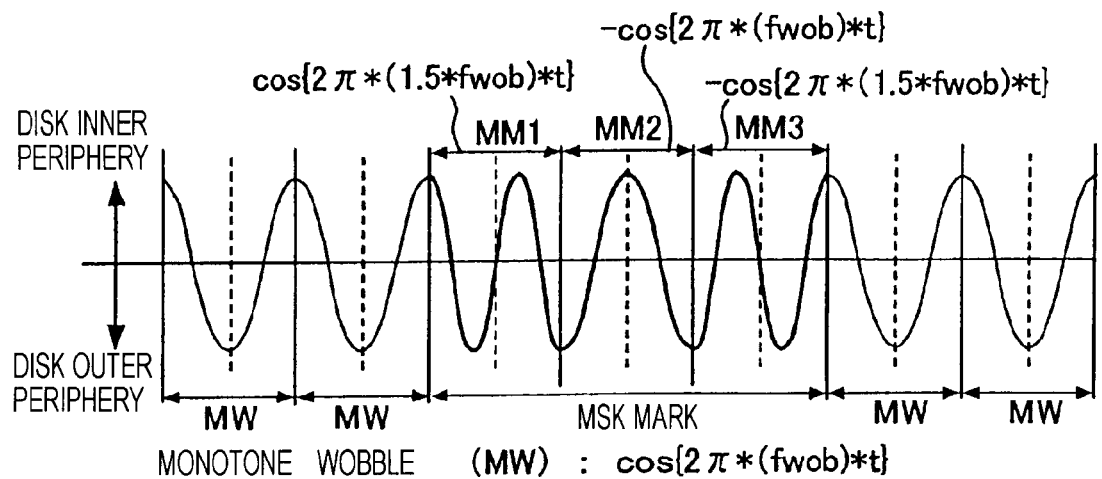
FIGS. 2A and 2B are explanatory diagrams of an MSK modulated wave and an STW modulated wave of a wobble signal.

FIG. 2A illustrates the MSK modulation. As shown in FIG. 2A, MSK modulated waveforms (MM1, MM2, and MM3) in three wobble periods are interposed between monotone wobbles MW.

If the monotone wobble is represented as $\cos(\omega t)$, one of the two frequencies used in the MSK modulation has the same frequency as the reference carrier signal, and the other has a frequency 1.5 times the reference carrier signal. The one of the signal waveforms used in the MSK modulation is $\cos(\omega t)$ or $-\cos(\omega t)$, while the other is $\cos(1.5\,\omega t)$ or $-\cos(1.5\,\omega t)$.

FIG. 2A shows two monotone wobbles, the MSK modulated area, and two monotone wobbles. In that case, the signal waveform of an MSK stream is $\cos(\omega t)$, $\cos(\omega t)$, $\cos(1.5\,\omega t)$, $-\cos(\omega t)$, $-\cos(1.5\,\omega t)$, $\cos(\omega t)$ every one wobble period. As shown, $\cos(\omega t)=\cos\{2\pi\cdot(\text{fwob})\cdot t\}$ where fwob is the reference carrier frequency. The three wobble periods as the MSK modulated area is $MM1=\cos\{2\pi\cdot(1.5\cdot\text{fwob})\cdot t\}$, $MM2=-\cos\{2\pi\cdot(\text{fwob})\cdot t\}$, and $MM3=-\cos\{2\pi\cdot(1.5\cdot\text{fwob})\cdot t\}$.

The first wobble period (MM1) has the frequency 1.5 times the monotone wobble, the second wobble period (MM2) has the same frequency as the monotone wobble, and the third wobble period (MM3) has the frequency 1.5 times the monotone wobble. Within three wobble periods, phase reverts to the first phase. More specifically, the preceding wobble and the subsequent wobble are continuous in phase, and the second wobble (MM2) has a polarity inverted from the monotone wobble.

By setting wobble signal to be the MSK stream as described above in the optical disk 1, the address information is modulated in the wobble signal. The MSK modulated signal can be synchronously detected as described below.

When data modulated in the MSK modulation is inserted into the wobble signal in the optical disk 1, a data stream of data to be modulated is differential coded by a clock period unit corresponding to the wobble period. More specifically, the stream of the data to be modulated and data delayed by one period of the reference carrier signal are subjected to a differential process. The differential coded data is set to be precode data. The precode data is MSK modulated and the above-described MSK stream is generated.

In the differential coded data (precode data), a bit is set (to 1) when the code of the data changes. Since the code length of the data is at least twice the wobble period, the reference carrier signal ($\cos(\omega t)$) or the opposite signal ($-\cos(\omega t)$) thereof is inserted into a latter half of the code length of the data. If the bit of the precode data becomes "1", the waveform having the frequency 1.5 times the reference carrier signal is inserted, and the waveform is concatenated with the phase matched at a code switching point. The signal waveform inserted into the latter half of the code length of the data is the reference carrier signal ($\cos(\omega t)$) if the data is "0", and is the opposite signal ($-\cos(\omega t)$) thereof if the data is "1". The synchronous detection output becomes a positive value if the phase matches the carrier signal, and becomes a negative value if the phase is inverted. If the MSK modulated signal is synchronous detected with the reference carrier signal, demodulation of the modulated data is possible.

The STW modulation will be described next.

In the STW modulation, the even order harmonic signals are added to the sinusoidal carrier signal. The polarity of the harmonic signal is changed in response to the code of the data. A digital signal is thus modulated.

The carrier signal of the STW modulation is a signal identical in frequency and phase to the reference carrier signal ($\cos(\omega t)$) as the carrier signal of the MSK modulation. The even order harmonic signals to be added are the second harmonic wave $\sin(2\omega t)$ and $-\sin(2\omega t)$ of the reference carrier signal $\cos(\omega t)$, and have an amplitude of $-12$ dB referenced to the amplitude of the reference carrier signal. The minimum code length of the data is twice the wobble period (the period of the reference carrier signal).

If the code of the data is "1", $\sin(2\omega t)$ is added to the carrier signal, and if the code of the data is "0", $-\sin(2\omega t)$ is added to the carrier signal in modulation.

Figure 2B:
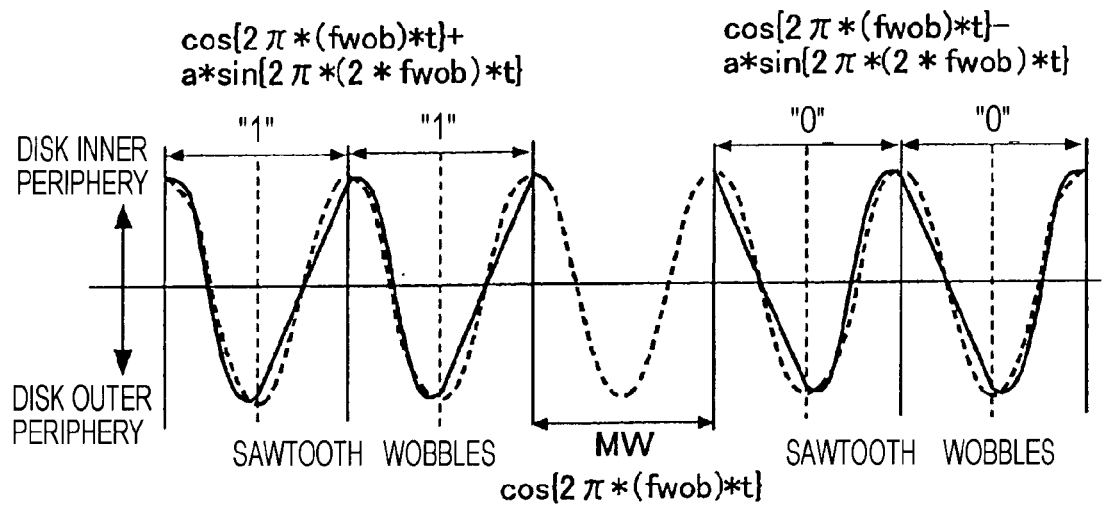

FIG. 2B illustrates a signal waveform of the modulated wobble signal. As shown in FIG. 2B, the signal waveform of the monotone wobble MW of the reference carrier signal ($\cos(\omega t)$) is placed in the central wobble duration. The signal waveform in the preceding two wobble periods has $\sin(2\omega t)$ added to the reference carrier signal ($\cos(\omega t)$), namely, the signal waveform with the data being "1". The two wobble periods subsequent to the monotone wobble MW has a signal waveform having $-\sin(2\omega t)$ added to the reference carrier signal ($\cos(\omega t)$), namely, the signal waveform with the data being "0".

As shown, the monotone wobble $\cos(\omega t)=\cos\{2\pi\cdot(\text{fwob})\cdot t\}$, and the STW modulated signal is $\cos\{2\pi\cdot(\text{fwob})\cdot t\}+a\cdot\sin\{2\pi\cdot(2\cdot\text{fwob})\cdot t\}$ if the data is "1". The STW modulated signal is $\cos\{2\pi\cdot(\text{fwob})\cdot t\}-a\cdot\sin\{2\pi\cdot(2\cdot\text{fwob})\cdot t\}$ if the data is "0".

As shown in FIG. 2B, the STW signal in one waveform rises sharply toward a disk outer periphery and then mildly returns toward a disk outer periphery, and in the other waveform rises mildly toward a disk outer periphery and then sharply returns toward a disk inner periphery, in order to represent "1" and "0". The two waveforms share the common zero-crossing points with the monotone wobble MW represented by a broken line. When a clock is extracted from a fundamental wave common to the MSK monotone wobble MW, the phase of the clock does not affect.

When the positive and negative even order harmonic signals are added to the reference carrier signal, the modulated data is demodulated based on characteristics of the generated waveform, by synchronously detecting the modulated signal with the harmonic signals and by integrating the synchronous detection output with the code length of the modulated data.

The second harmonic waves are added to the carrier signal in the optical disk 1. The harmonic wave to be added is not limited to the second harmonic wave. Any even order harmonic can be added. Although only the second order harmonic wave is added in the optical disk 1, a plurality of order harmonic waves can be concurrently added, for example, both the second order harmonic wave and the fourth order harmonic wave can be concurrently added.

The ADIP structure containing the MSK modulation and the STW modulation is described below. One unit as ADIP information (ADIP unit) is composed of 56 wobbles.

Figure 3B:
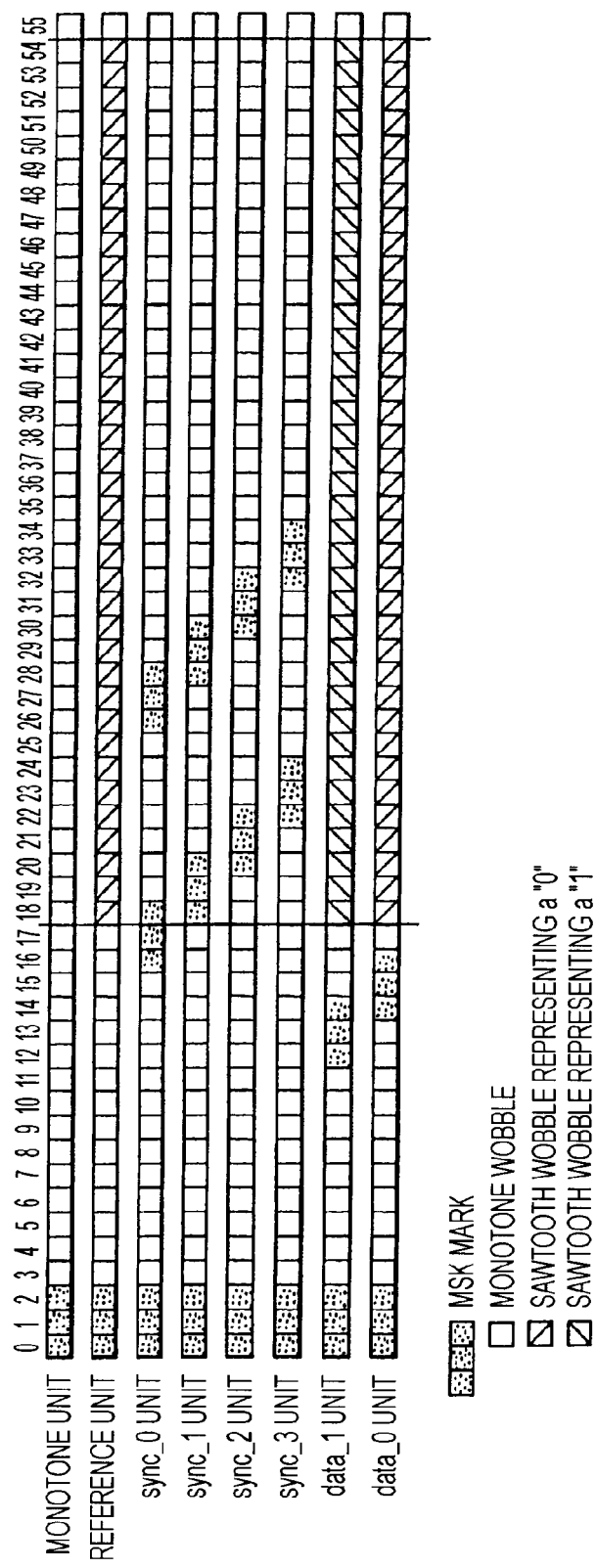

FIG. 3B shows ADIP units of eight types. The ADIP units of eight types are a monotone unit, a reference unit, a sync 0 unit, a sync 1 unit, a sync 2 unit, a sync 3 unit, a data 1 unit, and a data 0 unit.

In the ADIP units of the eight types, wobble numbers 0, 1, and 2 in the head thereof represent an MSK mark.

In the monotone unit, wobble numbers 3-55 in succession to the MSK mark are all monotone wobbles.

In the reference unit, wobble numbers 18-54 are STW modulated wobbles representing 0 value.

The sync 0 unit, the sync 1 unit, the sync 2 unit, and the sync 3 unit are ADIP units for sync information. As shown in FIG. 3B, an MSK mark is positioned at a predetermined wobble number position.

The data 1 unit represents a value "1", and the data 0 unit represents a value "0". In the data 1 unit, the MSK mark is arranged at wobble numbers 12-14, and wobble numbers 18-54 are STW modulated wobbles having a value "1". In the data 0 unit, the MSK mark is arranged in wobble numbers 14-16, and wobble numbers 18-54 are STW modulated wobbles having a value "0".

A single piece of ADIP information (address information) is thus composed of 83 ADIP units.

As shown in FIG. 4, one unit of ADIP information is composed of ADIP units 0-82. The ADIP unit numbers 0-7 are a monotone unit, a sync 0 unit, a monotone unit, a sync 1 unit, a monotone unit, a sync 2 unit, a monotone unit, and a sync 3 unit.

In the ADIP unit number 8 and subsequent ADIP unit numbers, five units including a reference unit and data units of 4 bits are repeated. Each of the data units (for example, data[0], data[1], data[2], data[3], . . . , data[59]) is either data 1 unit or data 0 unit. The ADIP information of 60 bits is thus indicated. The 60 bits includes an address value, additional information, and an ECC (error correcting code) parity.

2. Configuration of Disk Drive Device

Figure 5:
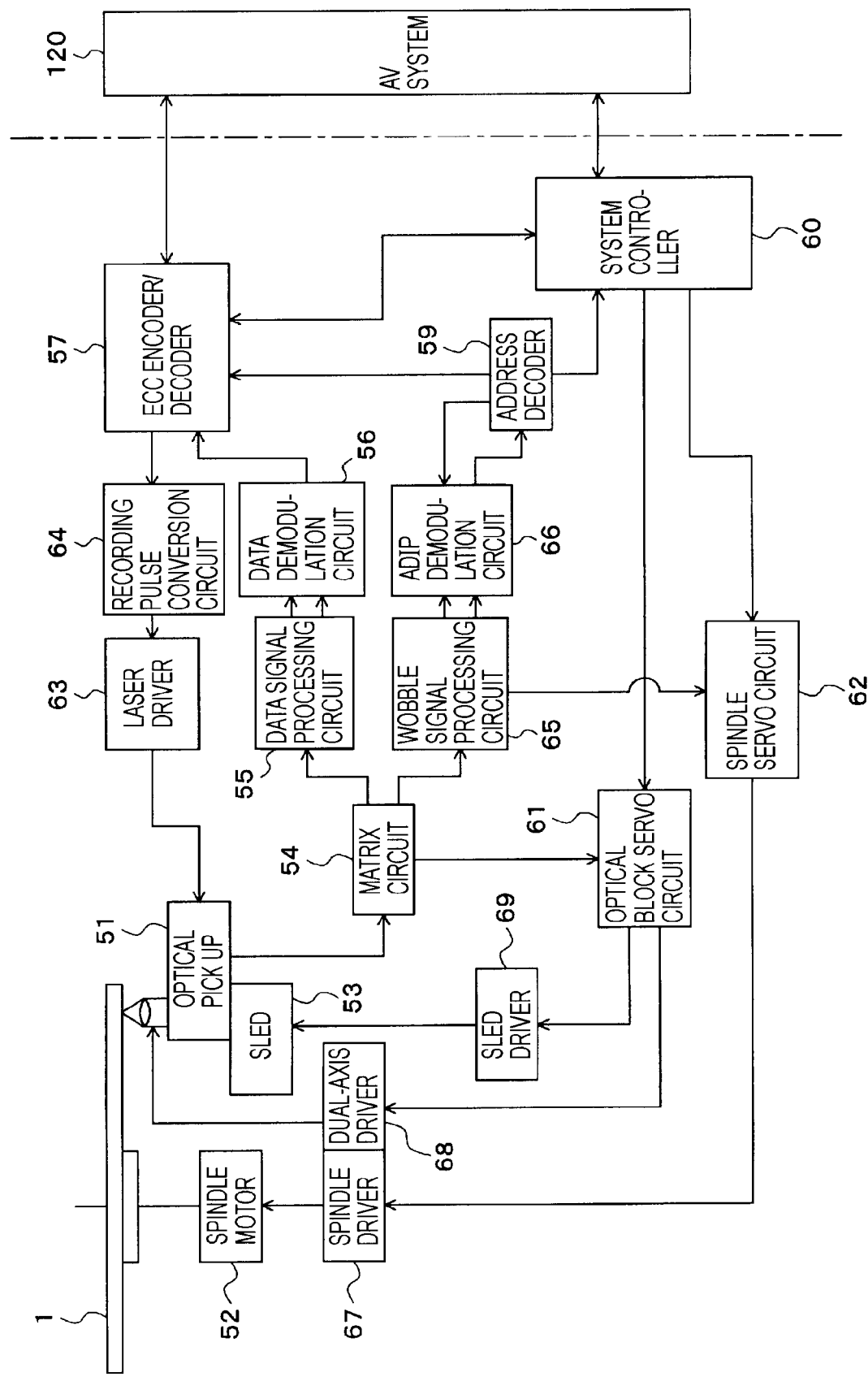
FIG. 5 is a block diagram of a disk drive device according to an embodiment of the present invention.

A disk drive device capable of recording data to and reproducing data from the optical disk 1 will be described below. FIG. 5 illustrates a configuration of a disk drive device.

The optical disk 1 is placed on a turntable (not shown), and is rotatably driven at a constant linear velocity (CLV) by a spindle motor 52 during recording/reproducing operations.

An optical pickup (optical head) 51 reads the ADIP information embedded as a wobble in a groove track on the optical disk 1.

Read-only management information, such as, for example, disk physical information, is recorded in an emboss pit or a wobbling groove on the optical disk 1. Such information is read by the optical pickup 51.

The optical pickup 51 records user data in a phase change mark during data recording, and reads a recorded mark during reproduction.

The optical pickup 51 contains a laser diode serving as a laser light source, a photodetector detecting reflected light, an objective lens serving as an output end of a laser light beam, and an optical system (not shown) directing the laser beam to a disk recording surface through the objective lens, and guiding the reflected laser beam toward the photodetector. The laser diode outputs a blue laser having a wavelength of 405 nm, for example. The NA (numerical aperture) of the optical system is 0.85.

The objective lens is movably supported by a dual-axis mechanism in a tracking direction and a focus direction in the optical pickup 51.

The entire optical pickup 51 is movably supported by a sled mechanism 53 in a radial direction of the optical disk 1.

The laser diode in the optical pickup 51, driven by a drive signal (drive current) by a laser driver 63, emits a laser light beam.

Information in a laser light beam reflected from the optical disk 1 is detected by the photodetector. The photodetector converts the laser light information into an electrical signal responsive to an amount of received light, and supplies the resulting electrical signal to a matrix circuit 54.

The matrix circuit 54 includes a current-voltage converter circuit corresponding to an output current from a plurality of photosensitive elements as the photodetector, and a matrix calculating and amplifying circuit. The matrix circuit 54 generates required signals in a matrix calculation process.

For example, a high-frequency signal (reproduced data signal) equivalent to the reproduced data, a focus error signal for servo control, and a tracking error signal are generated.

Furthermore, a signal relating to the wobbling of the groove, namely, a push-pull signal as a signal detecting the wobble is also generated.

The reproduced data signal outputted from the matrix circuit 54 is supplied to a data signal processing circuit 55. The focus error signal and the tracking error signal are supplied to an optical block servo circuit 61. The push-pull signal is supplied to a wobble signal processing circuit 65.

The data signal processing circuit 55 binarizes the reproduced data signal, and generates a reproduced clock through a phase-lock loop (PLL) process, thereby reproducing the data read as a phase change mark, for example. The reproduced data is then supplied to a data demodulation circuit 56.

During reproduction, the data demodulation circuit 56 decodes run-length limited code in accordance with the reproduced clock. The data having undergone the demodulation process is supplied to an ECC (error correcting code) encoder/decoder 57.

The ECC encoder/decoder 57 performs an ECC encoding process for attaching an error correcting code during recording and an ECC decoding process for error correction during reproduction.

During reproduction, the ECC encoder/decoder 57 captures the data demodulated by the data demodulation circuit 56 into an internal memory thereof, and performs an error detection and correcting process, and a deinterleave process on the data, thereby obtaining in the reproduced data.

The reproduced data decoded by the ECC encoder/decoder 57 is read in response to an instruction from a system controller 60 and transferred to an AV (audio-visual) system 120.

A push-pull signal outputted from the matrix circuit 54 as the signal relating to the wobbling of the groove is digitalized by a wobble signal processing circuit 65 to generate wobble data. In addition, clock signals (a wobble clock WCK and a master clock MCK described later) synchronized to the push-pull signal through the PLL process are also generated.

AN ADIP demodulation circuit 66 MSK demodulates and STW demodulates the wobble data to data scream constituting an ADIP address, and supplies the data stream to an address decoder 59.

The address decoder 59 decodes the supplied data, thereby obtaining the address value. The address value is supplied to the system controller 60.

The MSK demodulation and the STW demodulation performed by the ADIP demodulation circuit 66 will be described later.

During recording, record data is transferred from the AV system 120. The record data is transferred to a memory in the ECC encoder/decoder 57 for buffering.

In this case, the ECC encoder/decoder 57 performs an encode process on the buffered record data, thereby attaching an error correcting code, performing an interleave operation, and attaching a subcode.

The ECC encoded data is modulated by a recording pulse conversion circuit 64 into RLL (run length limited) (1-7) PP (parity preserve/prohibit rmtr(repeated minimum transition run length)) method. A clock signal generated from the wobble signal is used as an encode clock serving as a reference clock for the encoding process during recording.

A laser driver 63 performs a record correction process on the record data generated in the encode process by the recording pulse conversion circuit 64. More specifically, the laser driver makes adjustments taking into consideration characteristics of a recording layer, and a spot configuration of the laser light beam, makes a fine adjustment of an optimum recording power in response to a recording linear velocity, and makes adjustments on a laser drive pulse waveform. The laser driver 63 then supplies the laser drive pulse having undergone the record correction process to a laser diode contained in an optical pickup 51 for laser light emission. A pit (phase change mark) is thus formed in response to the record data on the optical disk 1.

The laser driver 63, including an auto power control (APC) circuit, monitors a laser output power with an output from a laser power monitoring detector arranged in the optical pickup 51 to control the laser output power to a constant value regardless of temperature change. The system controller 60 provides a target value of the laser output during recording and reproduction. During recording and reproduction, the laser driver 63 controls the laser output level to the target value.

The optical block servo circuit 61 generates servo drive signals for focusing, tracking, and sledding in response to the focus error signal and the tracking error signal from the matrix circuit 54, thereby performing servo control.

More specifically, the optical block servo circuit 61 generates a focus drive signal and a tracking drive signal in response to the focus error signal and the tracking error signal, respectively, to control a focus coil and a tracking coil in the dual-axis mechanism in the optical pickup 51 by a dual-axis driver 68. With this configuration, a tracking servo loop and a focus servo loop by the dual-axis mechanism are constructed of the optical pickup 51, the matrix circuit 54, the optical block servo circuit 61, and the dual-axis mechanism.

In response to a track jump instruction from the system controller 60, the optical block servo circuit 61 turns off the tracking servo loop and outputs a jump drive signal, thereby executing a track jump operation.

The optical block servo circuit 61 generates a sled error signal obtained as a low-frequency component of the tracking error signal, and a sled drive signal in response to access execution control from the system controller 60, thereby driving a sled mechanism 53 by the sled driver 69. The sled mechanism 53, including a main shaft holding the optical pickup 51, a sled motor, and a mechanism containing a transfer gear (all these elements not shown), drives the sled motor in response to the sled drive signal. The optical pickup 51 is thus slid to a target location.

A spindle servo circuit 62 controls the spindle motor 52 to rotate at the CLV.

The spindle servo circuit 62 acquires the clock generated through the PLL process to the wobble signal as current rotational speed information of the spindle motor 52, and compares the current rotational speed information with a predetermined CLV reference speed, thereby generating a spindle error signal.

During data reproduction, the reproduced clock generated by the PLL in the data signal processing circuit 55 (a clock serving as a reference in the decode process) becomes the current rotational speed information of the spindle motor 52. By comparing this current rotational speed information with the predetermined CLV reference speed information, a spindle error signal can also be generated.

The spindle servo circuit 62 outputs a spindle drive signal generated in response to the spindle error signal, thereby executing CLV rotation of the spindle motor 52 by the spindle driver 67.

The spindle servo circuit 62 generates the spindle drive signal in response to a spindle kick/brake control signal from the system controller 60, thereby starting, stopping, accelerating, and decelerating the spindle motor 52.

A variety of operations of the above-referenced servo system and the recording and reproduction system are controlled by the system controller 60 constituted by a microcomputer.

The system controller 60 executes the variety of processes in response to commands from the AV system 120.

Upon receiving a write command from the AV system 120, for example, the system controller 60 moves the optical pickup 51 to a write target address. The system controller 60 causes the ECC encoder/decoder 57 and the recording pulse conversion circuit 64 to perform an encode process on the data transferred from the AV system 120 (for example, audio data and video data in MPEG (moving picture experts group) 2) as described above. The laser driver 63 drives laser light emission in accordance with the above-described encoded data, thereby performing the recording.

When a read command requesting the transfer of data recorded on the optical disk 1 (such as MPEG2 video data) is supplied from the AV system 120, for example, a seek operation targeting an instructed address is performed. More specifically, a command is issued to the optical block servo circuit 61 to cause the optical pickup 51 to access a targeted address designated by a seek command.

Operational control is performed to transfer data within a designated session to the AV system 120. More specifically, the data is read from the optical disk 1, and the data signal processing circuit 55, the data demodulation circuit 56, and the ECC encoder/decoder 57 are caused to perform the decode/buffering operations. The requested data is thus transferred to the AV system 120.

During the data recording and reproduction with the phase change mark, the system controller 60 performs access control and recording and reproduction control using the ADIP address detected by the wobble signal processing circuit 65, the ADIP demodulation circuit 66, and the address decoder 59.

FIG. 5 illustrates the disk drive device connected to the AV system 120. The disk drive device according to the embodiment of the present invention can be connected to a personal computer or the like, for example.

The disk drive device may not be connected to another apparatus. In such a case, an operational panel and a display may be arranged on the disk drive device, and the structure of the data input and output interfaces may be different from those of FIG. 5. The recording and reproduction process is performed in response to a user operation, and terminals for inputting and outputting a variety of data are arranged.

Other arrangements are also contemplated. A record only device, or a reproduction only device can be contemplated.

3. Configuration of ADIP Demodulation System

Figure 6:
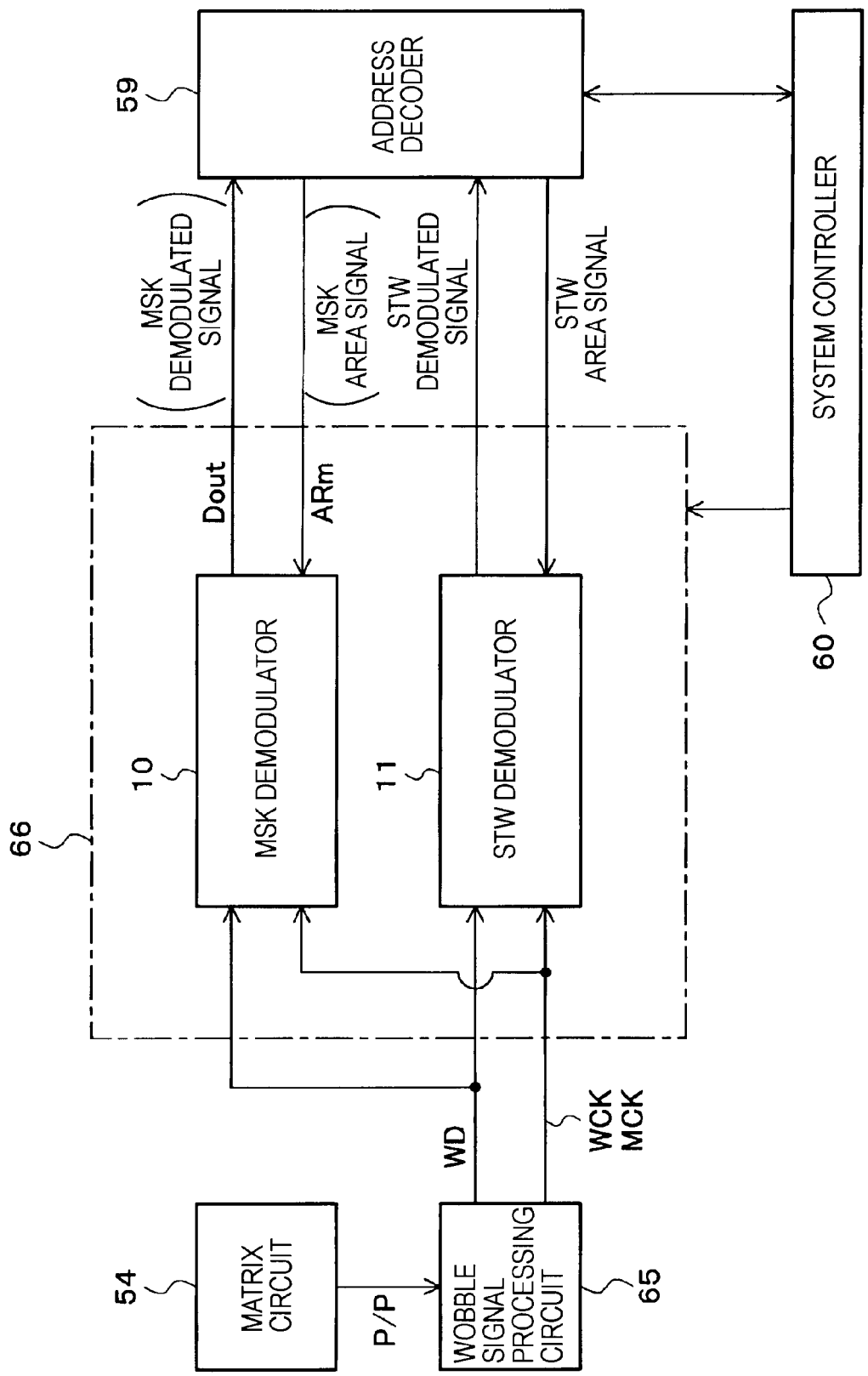
FIG. 6 is a block diagram of a wobble demodulation system of a disk drive device according to an embodiment of the present invention.

FIG. 6 illustrates only a circuit that acquires the ADIP information by demodulating the wobble signal among the above-described configuration shown in FIG. 5. As described above, the push-pull signal P/P from the matrix circuit 54 is supplied to the wobble signal processing circuit 65.

Figure 8:
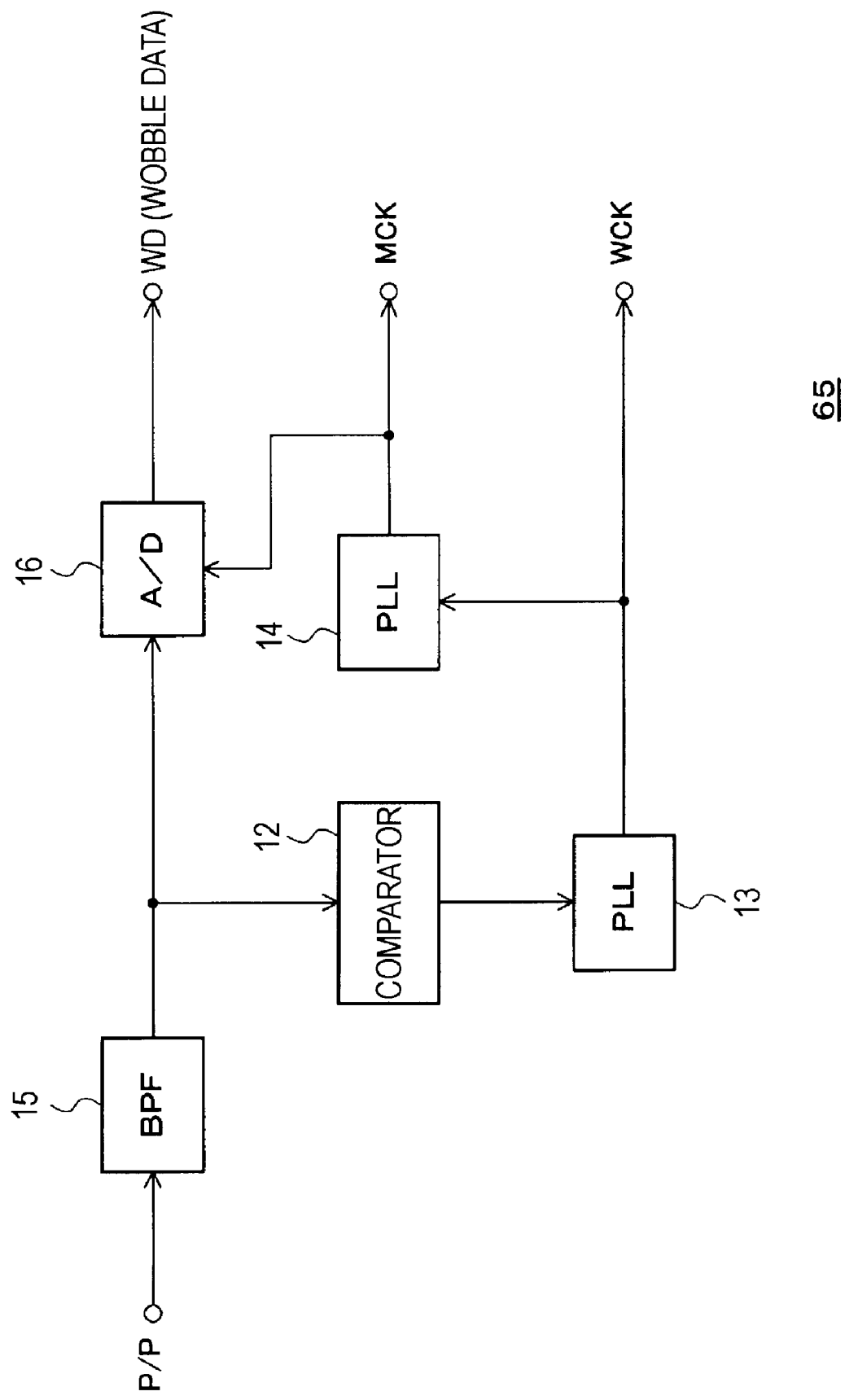
FIG. 8 is a block diagram of a wobble signal processing circuit according to an embodiment of the present invention.

For example, the wobble signal processing circuit 65 is configured as shown in FIG. 8.

A bandpass filter 15 of the wobble signal processing circuit 65 shown in FIG. 8 limits the band of the push-pull signal P/P input from the above-described matrix circuit 54 as a wobble groove modulation signal (wobble signal), and then supplies the push-pull signal to an analog-to-digital (A/D) converter 16 and a comparator 12. The A/D converter 16 converts the push-pull signal into digital data, and outputs the digital data. The output from the A/D converter 16 is the wobble data to be supplied to the ADIP demodulation circuit 66.

The comparator 12, composed of an operational amplifier and a comparator amplifier, binarizes the push-pull signal P/P. The binarized push-pull signal P/P is supplied to a PLL circuit 13.

The PLL circuit 13 generates a clock (wobble clock WCK) of the push-pull signal P/P, namely, a clock having a wobble frequency of the modulated signal of the wobbling groove. The PLL circuit 13 may be a digital circuit.

The wobble clock WCK output from the PLL circuit 13 is supplied to a PLL circuit 14. The PLL circuit 14 doubles the wobble clock WCK, thereby generating the master clock MCK. The master clock MCK serves as a sampling clock of the A/D converter 16. The PLL circuit 14 may be also constructed of one of an analog circuit and a digital circuit.

Wobble data WD and clocks (the wobble clock WCK and the master clock MCK) output from the wobble signal processing circuit 65 shown as FIG. 8 are supplied to an MSK demodulator 10 and an STW demodulator 11 in the ADIP demodulation circuit 66 as shown in FIG. 6.

The MSK demodulator 10 in the ADIP demodulation circuit 66 shown in FIG. 6 demodulates the wobble data, i.e., the digitalized push-pull signal P/P, using the wobble clock WCK and the master clock MCK, and outputs an MSK demodulated signal Dout.

The STW demodulator 11 also demodulates the wobble data, i.e., the digitalized push-pull signal P/P, and outputs an STW demodulated signal.

The MSK demodulated signal and the STW demodulated signal are supplied to the address decoder 59. The address decoder 59 decodes ADIP information, and supplies the ADIP information to the system controller 60.

The address decoder 59 supplies an STW area signal indicating an STW modulation interval shown in FIGS. 3A and 3B to the STW demodulator 11. The STW demodulator 11 demodulates the STW modulated data on the basis of the STW area signal.

Figure 7:
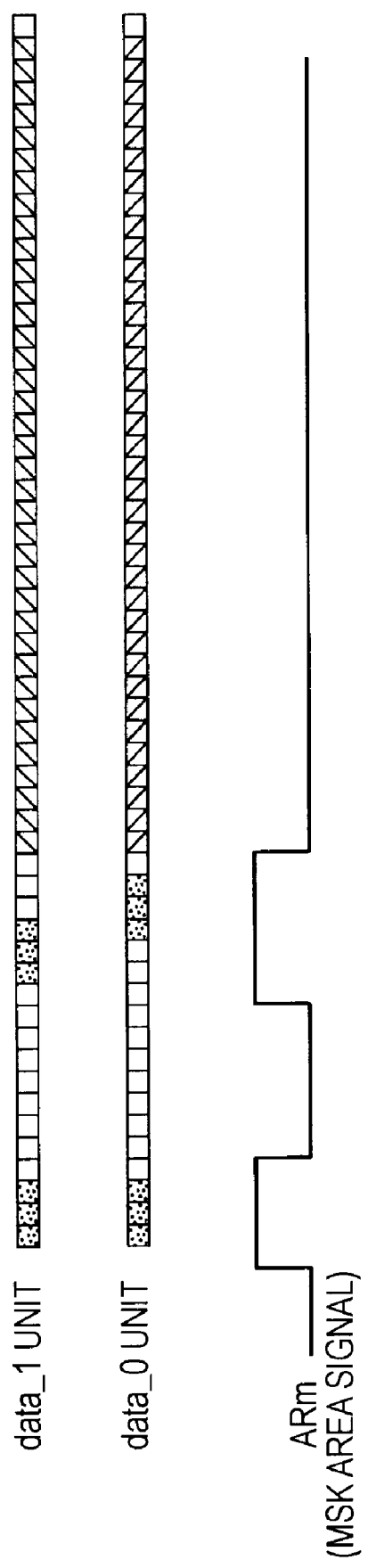
FIG. 7 is an explanatory diagram of an MSK area signal according to an embodiment of the present invention.

In addition, the address decoder 59 supplies an MSK area signal ARm indicating an MSK modulation interval shown in FIGS. 3A and 3B to the MSK demodulator 10. FIG. 7 illustrates the MSK area signal ARm. As shown in this figure, the MSK area signal ARm rises so as to include the MSK modulation intervals in the data 1 unit and the data 0 unit. That is, the MSK area signal ARm is a window signal indicating the MSK modulation intervals (intervals possibly including the MSK modulated signals).

The address decoder 59 synchronizes (bit-synchronization) units shown in FIG. 3B on the basis of the MSK demodulated signal. The address decoder 59 then confirms word-synchronization of the sync 0 unit to the sync 3 unit to establish the synchronization. More specifically, the address decoder 59 synchronizes the units by detecting the start of the MSK demodulated signal of each unit (wobble number 0, 1, and 2), and then synchronizes the ADIP information of 83 units shown in FIG. 4 by detecting the sync 0 unit to the sync 3 unit. The establishment of the synchronization allows the STW modulation intervals and the MSK modulation intervals to be found, whereby the STW area signal and the MSK area signal ARm can be generated.

In this embodiment, the MSK demodulator 10 particularly has a characteristic configuration. The MSK demodulator 10 may have the configuration shown in FIG. 9 and will be described with reference to FIGS. 10 to 18.

Figure 9:
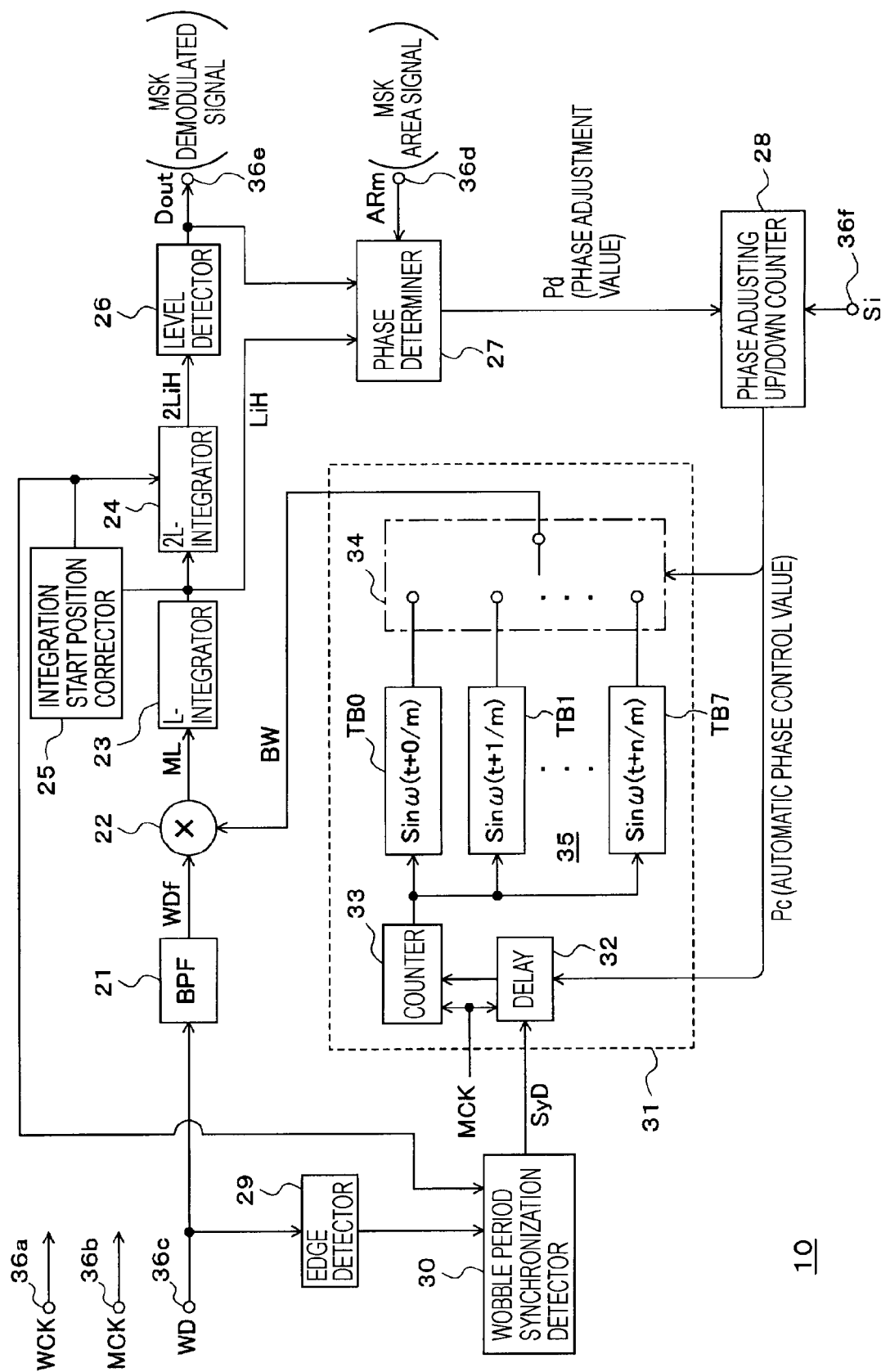
FIG. 9 is a block diagram of an MSK demodulator according to an embodiment of the present invention.

As described above, the wobble data obtained by the A/D converter 16 of the wobble signal processing circuit 65 shown in FIG. 8 is input to a terminal 36*c* of the MSK demodulator 10 shown in FIG. 9.

The wobble clock WCK and the master clock MCK output from the wobble signal processing circuit 65 are supplied to terminals 36*a* and 36*b*, respectively. Each unit in the MSK demodulator 10 uses the wobble clock WCK and the master clock MCK as reference clocks.

The MSK demodulator 10 obtains the MSK demodulated signal Dout from the wobble data WD through processing performed by a bandpass filter 21, a multiplier 22, an L-integrator 23, a 2L-integrator 24, and a level detector 26.

Figure 10:
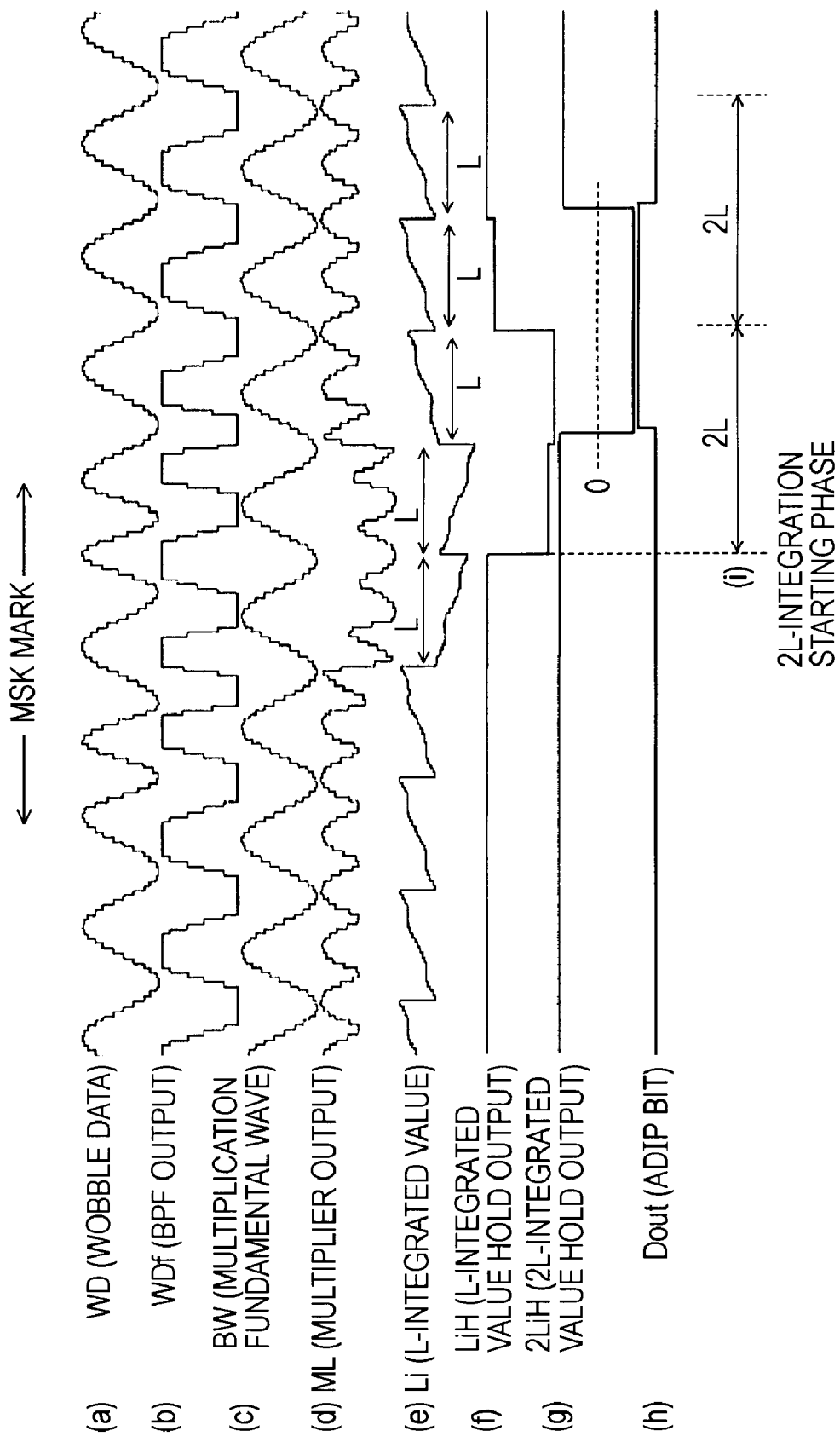
FIG. 10 is an explanatory diagram of signal waveforms in an MSK demodulation process according to an embodiment of the present invention.

The wobble data WD supplied from the wobble signal processing circuit 65 to the terminal 36*c* is supplied to the bandpass filter 21 and an edge detector 29. The waveform (a) of the wobble data WD is shown in FIG. 10.

The edge detector 29 binarizes the wobble data WD and detects the rising edge, and supplies an edge detection signal to a wobble period synchronization detector 30.

The wobble period synchronization detector 30 detects synchronization of the wobble data. For example, the wobble period synchronization detector 30 consider the wobble data WD is synchronized by confirming intervals between rising edges detected by the edge detection signals are equivalent to the wobble periods for a predetermined successive number of times. With this configuration, the wobble period synchronization detector 30 outputs a wobble period synchronization detection signal SyD to a multiplication fundamental wave generator 31. The wobble period synchronization detection signal SyD becomes H level when the wobble period synchronization detector 30 detects the synchronization, for example.

An exemplary configuration of the multiplication fundamental wave generator 31 will be described later. The multiplication fundamental wave generator 31 generates a multiplication fundamental wave BW, synchronized with the wobble data WD, in accordance with the wobble period synchronization detection signal SyD. The multiplication fundamental wave generator 31 then outputs the multiplication fundamental wave BW to the multiplier 22. Generally, the multiplication fundamental wave BW is a sine wave or a cosine wave having the wobble period. A waveform (c) of FIG. 10 shows the multiplication fundamental wave BW.

The band of the wobble data WD, having the waveform (a) of FIG. 10, input from the terminal 36*c* is limited by the bandpass filter 21. The wobble data WDf (band-limited wobble data), shown as the waveform (b) of the FIG. 10, is supplied to the multiplier 22, for example.

The multiplier 22 multiplies the wobble data WDf having the waveform (b) of FIG. 10 and the multiplication fundamental wave BW having the waveform (c) of FIG. 10. The multiplier 22 outputs a multiplier output ML having a waveform (d) of FIG. 10 as the multiplication result.

The L-integrator 23 integrates the multiplier output ML in wobble period unit. "L" means one wobble period. The L-integrator 23 integrates the multiplier output ML for each wobble period to calculate an integrated value Li (a waveform (e) of FIG. 10). The L-integrator 23 holds and outputs an integrated value for one wobble period as an L-integrated value hold output LiH, a waveform (f) of FIG. 10.

The 2L-integrator 24 integrates the L-integrated value hold output LiH in 2L unit, i.e., in two wobble period unit. More specifically, the 2L-integrator 24 integrates the L-integrated value hold output LiH at a wobble period and the L-integrated value hold output LiH at the next wobble period, and holds and outputs the result.

The 2L-integrator 24 performs integration process after a 2L-integration starting phase shown as a period (i) in FIG. 10 is decided. Thereafter, a 2L-integrated value hold value 2LiH, shown as a waveform (g) in FIG. 10, is obtained every two wobble periods from the decided 2L integration starting phase.

A level detector 26 detects the level (or determines positive or negative of) the 2L integrated value hold output 2LiH. For example, suppose that "0" is set as a threshold. If the 2L integrated value hold output 2LiH is positive, a demodulation bit is set to "0", whereas, if the output 2LiH is negative, the demodulation bit is set to "1". The detection result is supplied from a terminal 36*e* to the subsequent address decoder 59 as a demodulation output of the ADIP bit, namely, an MSK demodulated signal Dout.

The integrated value obtained by the L-integrator 23 for one wobble period shifts in a positive direction in response to monotone wobble parts of the wobble data WD. On the other hand, the integrated value obtained by the L-integrator 23 shifts in a negative direction in response to MSK mark parts. As a result, the 2L-integrated value hold output 2LiH obtained by the 2L-integrator 24 becomes positive for the monotone wobbles, whereas the 2L-integrated value hold output 2LiH becomes negative for MSK marks. Accordingly, regarding detection results of the level detector 26 represented by "0" and "1", a bit array of "1" appears for the MSK marks, which thus corresponds to the demodulated signal in which the MSK marks are detected from the wobble data WD.

The address decoder 59 decodes the ADIP bits, namely, the MSK demodulated signal Dout, thereby obtaining the ADIP address information.

Such a demodulation process is appropriately performed only when the 2L-integrator 24 uses the correct the 2L integration starting phase. If the 2L-integrator 24 does not use the correct 2L integration starting phase, the appropriate demodulation process cannot be performed.

For this reason, an integration start position corrector 25 is provided. The integration start position corrector 25 determines whether the 2L integration phase of the 2L-integrator 24 is in the correct state. If the 2L integration phase is not correct, the integration start position corrector 25 corrects the 2L integration starting phase.

Techniques for determining and correcting the 2L integration phase are not described in detail here. For example, the integration start position corrector 25 may monitor the demodulation bit detection phase from the L-period integration result with respect to the integration starting phase decided at the time of MSK demodulation process, and the necessity for correcting the 2L integration start phase may be determined by the occurrence of bits detected at odd number phases. Upon determining the inappropriate 2L integration starting phase, the integration start position corrector 25 corrects the phase. As a correction technique, the integration start position corrector 25 may control the 2L-integrator 24 to set the integration starting phase or to shift the integration phase. Alternatively, the integration start position corrector 25 may cause the wobble period synchronization detector 30 to set the synchronization.

The multiplication fundamental wave generator 31 includes a delay circuit 32, a counter 33, a selector circuit 34, and tables 35, and generates the multiplication fundamental wave BW.

The master clock MCK, input from the terminal 36b, is supplied to the delay circuit 32 and the counter 33. The delay circuit 32 delays the wobble period synchronization detection signal SyD to have a predetermined delay time in units of the master clock MCK, and supplies the delayed signal to the counter 33.

In this case, the delay time is set on the basis of an automatic phase control value Pc output from a phase adjusting up/down counter 28 described later.

The delay circuit 32 delays the wobble period synchronization detection signal SyD, and uses a rising edge of the delayed wobble period synchronization detection signal SyD as timing of resetting or starting the counter 33. As will be discussed later, by adjusting the delay time, the delay circuit 32 adjusts the multiplication fundamental wave BW for demodulation to be in phase with the wobble data WDf.

The delay circuit 32 includes, but is not limited to, a selector and a shift register including a flip-flop, for example. The delay circuit 32 may also be constituted by a digital counter, or an analog circuit of CR (capacitor and resister) structure. Alternatively, the delay circuit 32 may be composed of a buffer and a selector.

The wobble period synchronization detection signal SyD output from the delay circuit 32 is supplied to the counter 33 as a reset/start signal.

The counter 33 counts the master clock MCK. Upon receiving the reset/start signal from the delay circuit 32, the counter 33 resets the count. More specifically, the counter 33 resets the counted value at the edge of the delay wobble period synchronization detection signal SyD, and starts counting the master clock MCK. If the counted value becomes equivalent to one wobble fundamental wave period, the counter 33 resets the counted value to "0", and continues to count.

For example, if the master clock MCK has a frequency of 23 clock periods in one period of the wobble fundamental wave, the counter 33 repeatedly generates the counted value from "0" to "22".

The counter 33 outputs the counted value to the tables 35 as a table address.

The tables 35 have, for example, eight tables TB0 to TB7. The number of the tables, i.e., eight, is only an example.

Each of the tables TB0 to TB7 is a table (ROM) storing waveform data of the multiplication fundamental wave. Each data is read in accordance with the value counted by the counter 33.

For example, 23 pieces of data TD0 to TD22 are stored as the waveform data in each of the tables TB0 to TB7. The data sequentially read in accordance with the count values "0" to "22", whereby the multiplication fundamental wave BW having the same frequency as the wobble fundamental wave is generated as shown by the waveform (c) in FIG. 10.

The waveforms of the multiplication fundamental wave BW stored in each of the tables TB0 to TB7 are sine waves (or cosine waves) having a phase slightly shifted to one another. That is, the data TD0 to TD22 of each of the tables TB0 to TB7 indicates waveforms for one wobble period whose phases are shifted to one another. The phase difference in data of each of the table TB0 to TB7 will be described later.

The selector circuit 34 selects one of the tables TB0 to TB7. The sector circuit 34 selects one table on the basis of the automatic phase control value Pc supplied from the up/down counter 28.

The automatic phase control value Pc output from the up/down counter 28 may be, for example, an 8-bit value. Most significant 5 bits indicate a 23-step delay amount used in the delay circuit 32, whereas less significant 3 bits indicate a selection value for one of the tables TB0 to TB7 used in the selector circuit 34.

Waveform data, serving as the multiplication fundamental wave BW, is sequentially output from each of the tables TB0 to TB7 in accordance with the counted value from the counter 33. The multiplication fundamental wave BW supplied from the table TBx selected by the selector circuit 34 is supplied to the multiplier 22.

The tables 35 serve to generate the multiplication fundamental wave BW. Configurations other than the tables can be used as long as it can output waveform data. The configuration may be set by the system controller 60 using a RAM, or constituted by a combinational circuit. Alternatively, shift registers for sequentially outputting a data array or an analog circuit including an oscillator may be adopted. In addition, a signal to be generated may be a sine wave or a cosine wave. A circuit generating a rectangular wave may be used.

Additionally, the counter 33, the tables 35, and the selector circuit 34 are only an exemplary configuration for generating the multiplication fundamental wave BW having various phases as described later. Such configurations are not limited to the above example as long as similar operations are performed. For example, the system controller 60 may set the counter 33 so that the counted value is incremented or decremented by steps of "n" rather than "1", and "n" tables may be merged into a single table.

The MSK demodulator 10 according to this embodiment has a function for automatically adjusting phases of the wobble data WDf and the multiplication fundamental wave BW. For this reason, the MSK demodulator 10 includes a phase determiner 27 and the phase adjusting up/down counter 28.

Now, the necessity of phase adjustment and a technique for changing the phase of the multiplication fundamental wave BW will be described before describing operations of the phase determiner 27 and the up/down counter 28.

In the process performed by the MSK demodulator 10, as shown in FIG. 10, the L-integrated value Li from the L-integrator 23 shifts in the positive direction in the wobble fundamental wave (monotone wobble) interval of the input wobble data WD. On the other hand, the L-integrated value Li shifts in the negative direction in the MSK mark period. Because of this, the 2L-integrated value hold output 2LiH, i.e., the output from the 2L-integrator 24, becomes as the waveform (g) shown in FIG. 10. The level detector 26 determines positive or negative of the output, thereby obtaining the MSK demodulated signal Dout.

FIG. 10 shows a state where the phase of the wobble data WDf and the multiplication fundamental wave BW to be supplied to the multiplier 22 are aligned in phase. More specifically, when the phases are aligned, the best demodulation result can be obtained. On the other hand, if the phases of the wobble data WDf and the multiplication fundamental wave BW shift, a clear waveform shown in FIG. 10 cannot be obtained. An error may tend to occur in the positive or negative determination by the level detector 26. That is, the phase shift between the wobble data WD (WDf) and the multiplication fundamental wave BW decreases the demodulation accuracy.

Accordingly, the MSK demodulator 10 is configured to adjust the phase of the multiplication fundamental wave BW by selecting the delay amount in the delay circuit 32 and by selecting the table by the selector circuit 34.

For example, the up/down counter 28 generates, for example, an 8-bit automatic phase control value Pc with the operation described later and adjusts the delay amount in the delay circuit 32 using the most significant 5 bits, whereby the phase of the multiplication fundamental wave BW can be changeably set in units of master clock MCK.

For example, as described above, the master clock MCK has a frequency that 23 clock periods is included during one wobble fundamental waveform period. In this case, the phase of the multiplication fundamental wave BW can be adjusted in $1/23$ period unit by changing the delay amount in the delay circuit. More specifically, since the counter 33 is reset and started at the edge of the wobble period synchronization detection signal SyD output from the delay circuit 32, the timing of resetting and starting the counter 33 can be changed in 23 steps during one wobble period by changing the delay amount. The timing of resetting and starting the counter 33 corresponds to the output timing of the start data TD0 among the data TD0 to TD2 of the table TBx. Accordingly, the phase of the multiplication fundamental wave output from the table TBx can be changed in 23 steps during one wobble period by changing the delay amount in 23 steps.

Figure 11:
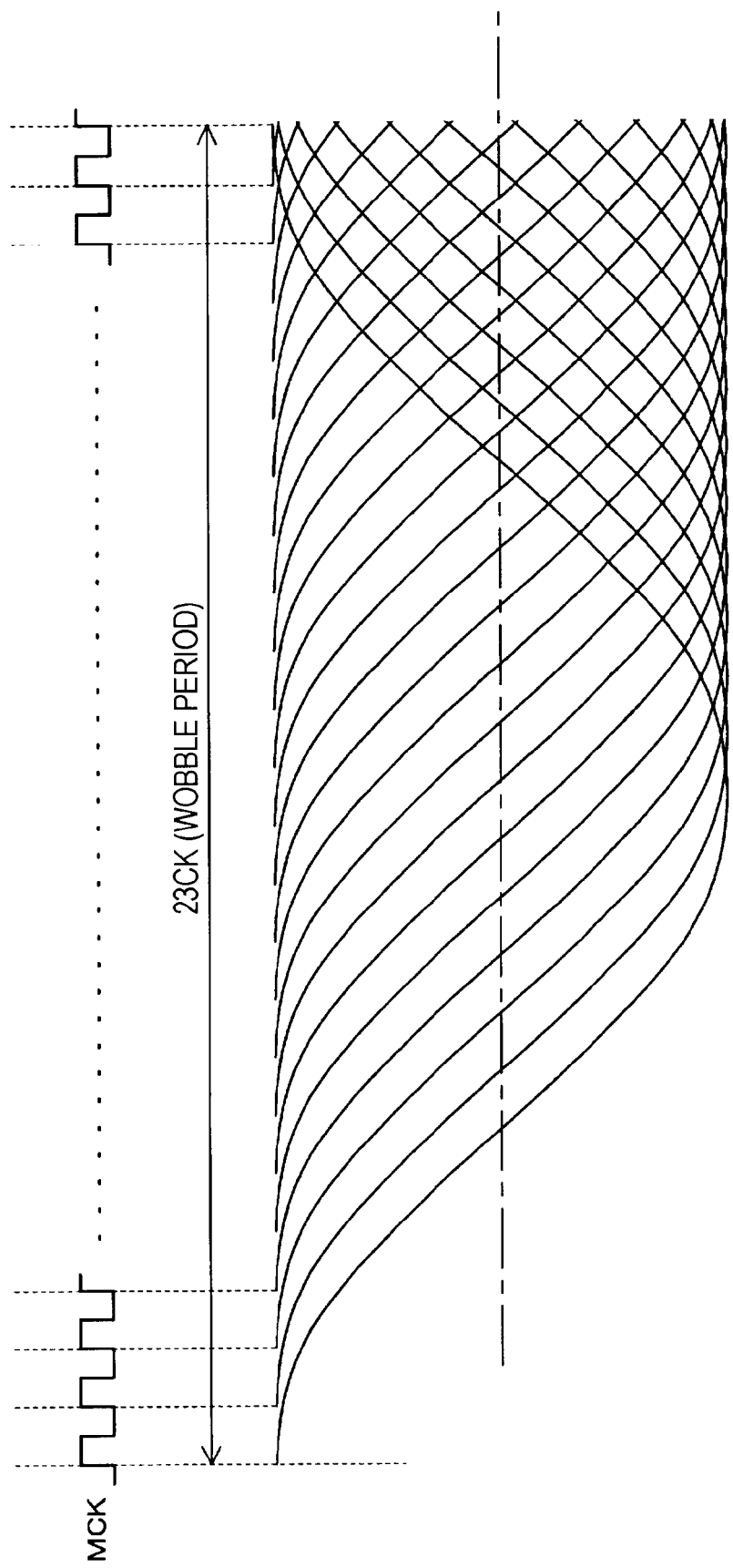
FIG. 11 is an explanatory diagram of phase adjustment by a delay time according to an embodiment of the present invention.

For example, FIG. 11 illustrates a state where the phase of the multiplication fundamental wave output from a table TBx can be adjusted in units of $1/23$ period by the delay time adjustment.

In addition to the phase adjustment performed by the delay circuit 32, the phase can be adjusted more accurately by the selector circuit 34 selecting one of the tables TB0 to TB7.

If the phase of the input wobble data WD crosses zero in response to the master clock MCK, the phase adjustment by the delay circuit 32 alone provides a sufficient effect. However, a delay in the function of circuits can shift the timing of an internal operation clock sampling. If the operational frequency is lowered, a sampling interval is widened, and a phase difference increases. The sample frequency becomes relatively low in a high data rate, in particular. The phase of the wobble signal waveform and the phase of the multiplication fundamental wave BW become greatly different. For this reason, the phase adjustment finer than the master clock unit needs to be performed.

The tables TB0 to TB7 are provided for finer phase adjustment than units of master clock. For example, multiplication fundamental waves having phases shifted by $1/8$ of one clock period are generated using eight tables TB0 to TB7.

Figure 12:
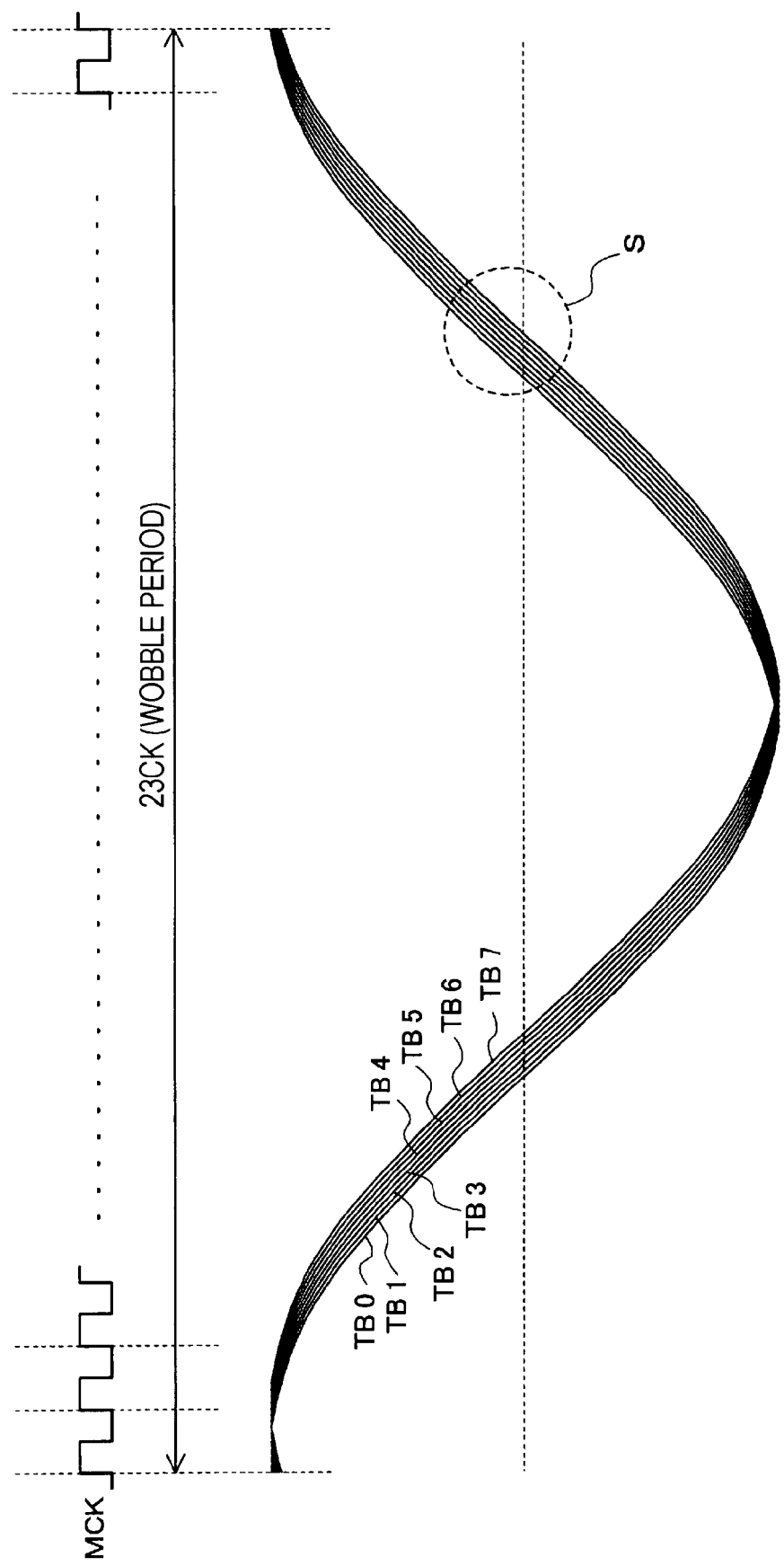
FIG. 12 is an explanatory diagram of phase adjustment by table selection according to an embodiment of the present invention.
Figure 13:
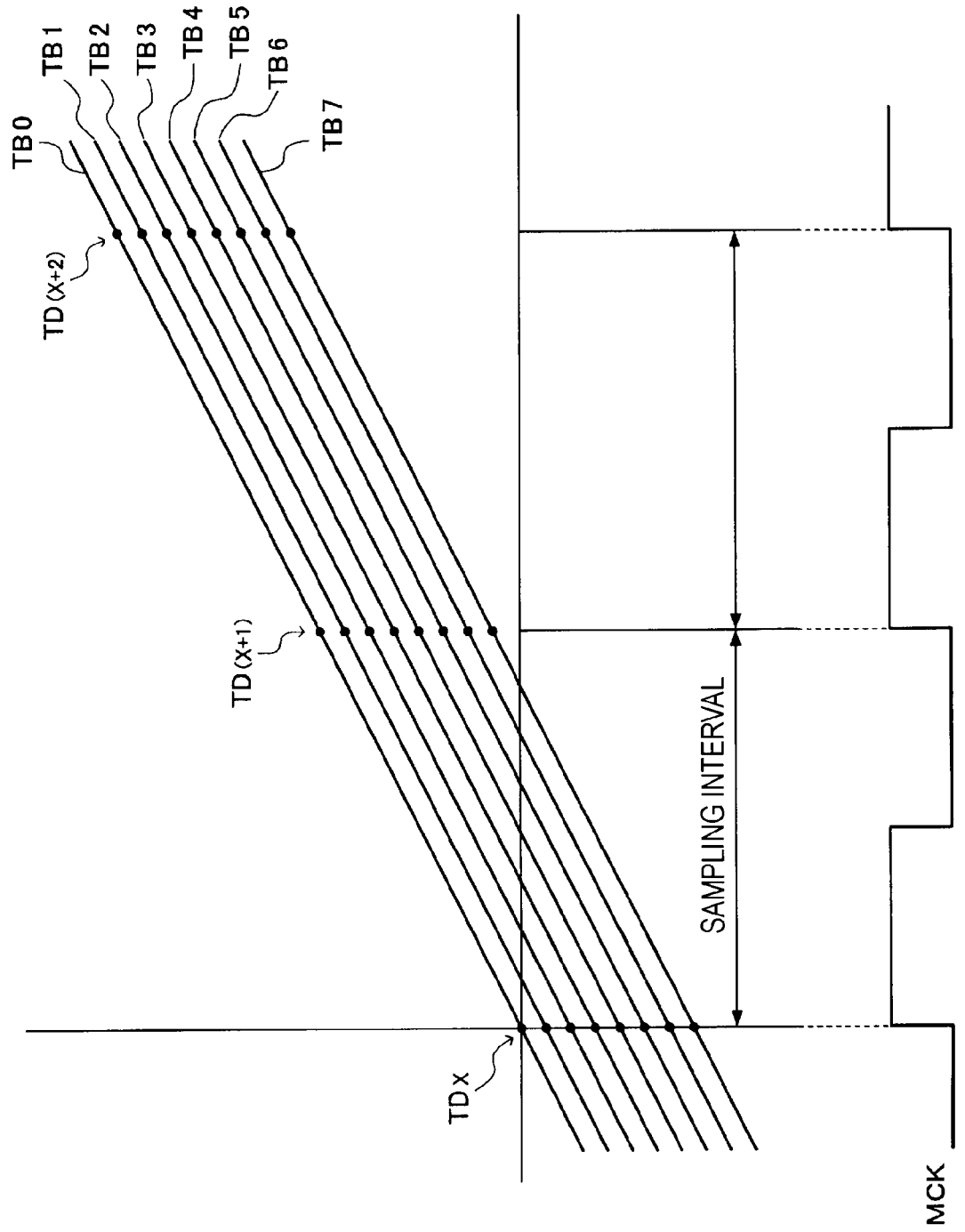
FIG. 13 is an explanatory diagram of a phase of a signal stored in each table according to an embodiment of the present invention.

FIG. 12 illustrates examples of waveform data stored in each of the tables TB0 to TB7. As shown, data stored in each of the tables TB0 to TB7 has a phase shifted by $1/8$ MCK period. FIG. 13 illustrates an enlarged part encircled by a broken line S in FIG. 12. As is clear from FIG. 13, data TD of each of the tables TB0 to TB7 is set so that the phases are shifted during a sampling interval based on the master clock MCK.

More specifically, the selector circuit 34 is controlled using the least significant 3 bits of 8-bit phase adjustment value generated by the up/down counter 28 to select one of the tables 35, whereby finer phase adjustment becomes possible. That is, eight tables TB0 to TB7 realizes the phase adjustment of the same accuracy as that obtained by octupling the sampling frequency without increasing the sampling frequency (the frequency of the master clock).

In this manner, the fine phase adjustment can be performed on the multiplication fundamental wave BW by adjustment of delay time in the delay circuit 32 and by selection of one of the tables TB0 to TB7 in the selector circuit 34. The phase detector 27 and the up/down counter 28 automatically control such phase adjustment operations.

Figure 14:
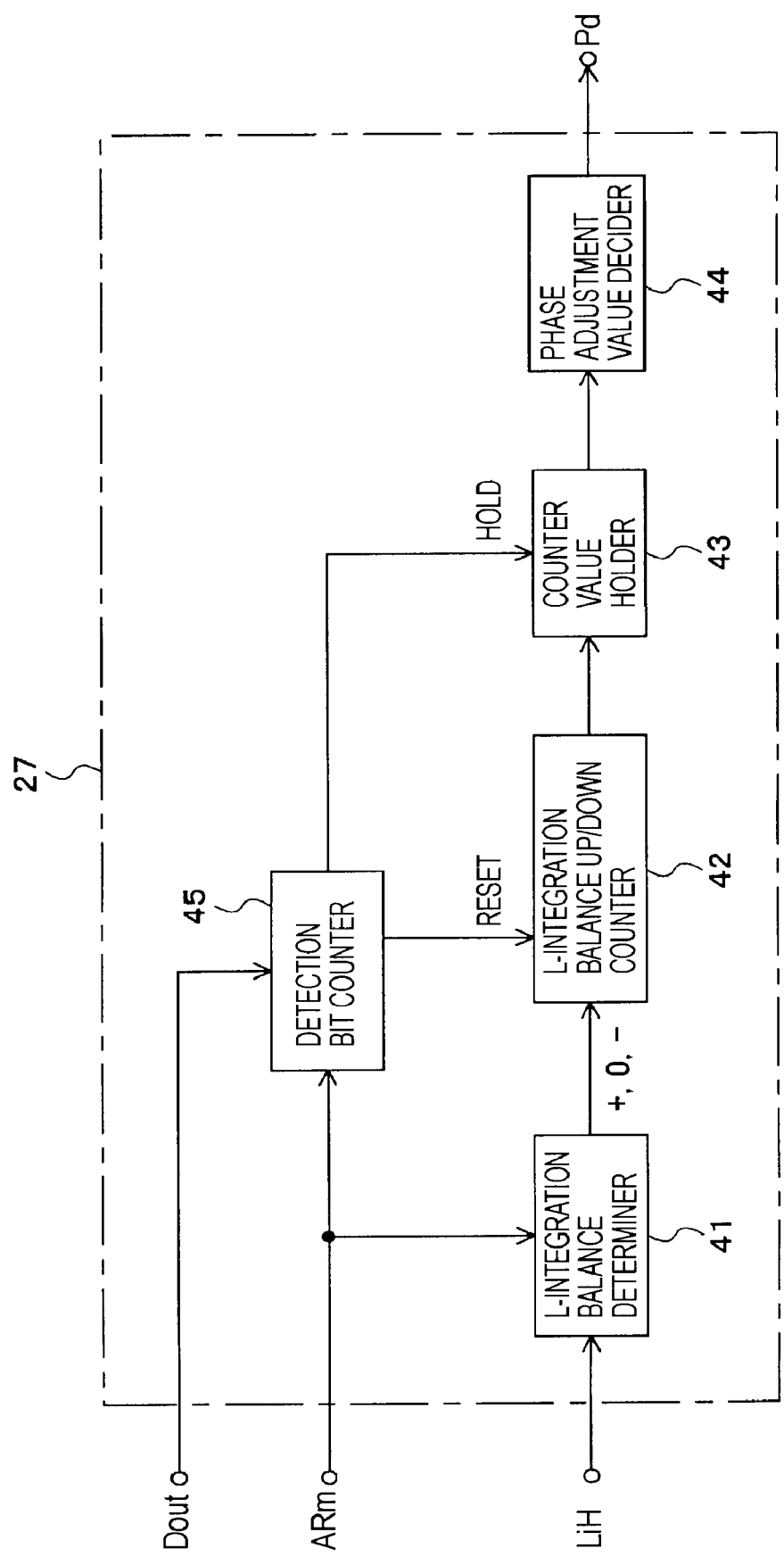
FIG. 14 is a block diagram of a phase determiner according to an embodiment of the present invention.
Figure 15:
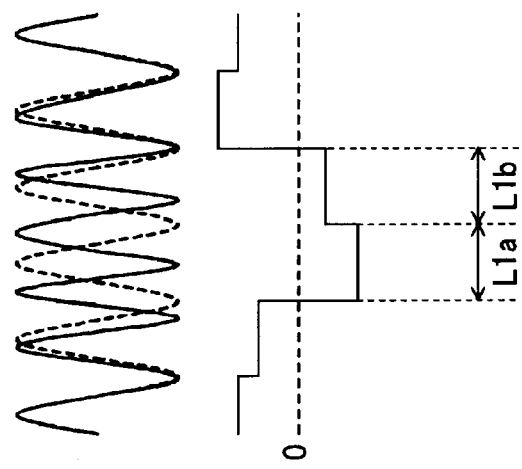
FIGS. 15A to 15C are explanatory diagrams of phase determination operations according to an embodiment of the present invention.

FIG. 14 illustrates a configuration of the phase determiner 27. The phase determiner 27 includes an L-integration balance determiner 41, an L-integration balance up/down counter 42, a counter value holder 43, a phase adjustment value decider 44, and a detection bit counter 45.

The L-integration balance determiner 41 is supplied with the L-integrated value hold output LiH by the L-integrator 23.

Additionally, the MSK area signal ARm, mentioned in FIG. 7, is supplied to the L-integration balance determiner 41 and the detection bit counter 45 from the address decoder 59 through the terminal 36d.

The MSK demodulated signal Dout output from the level detector 26 is also supplied to the detection bit counter 45.

The detection bit counter 45 counts up every time the value "1" of the MSK demodulated signal Dout is supplied thereto in the MSK modulation interval indicated by the MSK area signal ARm. For example, the detection bit counter 45 count the value from "0" to "n" (e.g., n=8). If the value becomes equal to "n", the detection bit counter 45 outputs a hold signal to the counter value holder 43. At time of next counting up, the detection bit counter 45 outputs a reset signal to the L-integration balance up/down counter 42, and at the same time resets the value counted therein.

That is, the detection bit counter 45 repeats counting of the value "1" of the MSK modulation signal until the counted value becomes "n", and holds the output of the counter value holder 43 every nth count.

The L-integration balance determiner 41 determines a cross-phase state of the wobble data WDf and the multiplication fundamental wave BW using a level balance of L-integrated value hold output LiH for two successive L periods, obtained as the integration results in the L-integrator 23, in the MSK modulation interval indicated by the MSK area signal ARm.

FIGS. 15A to 15C show level balances of the L-integrated value hold output LiH during two successive L periods corresponding to the cross-phase state of the wobble data WDf and the multiplication fundamental wave BW.

FIG. 15B shows an optimum phase state in which the wobble data WDf and the multiplication fundamental wave BW are in phase. In such a case, in illustrated periods L1a and L1b, the values of the L-integrated value hold output LiH below the zero-level become equal.

On the other hand, FIG. 15A shows phase lead of the multiplication fundamental wave BW. In this case, in the illustrated periods L1a and L1b, the value of the L-integrated value hold output LiH in the preceding period L1a exceeds that in the following period L1b.

Furthermore, FIG. 15C shows phase delay of the multiplication fundamental wave BW. In this case, in the illustrated periods L1a and L1b, the value of the L-integrated value hold output LiH in the preceding period L1a is lower than that in the following period L1b.

By utilizing this relationship, the L-integration balance determiner 41 can determine the phase shift.

The L-integration balance determiner 41 compares the values of the L-integrated value hold output LiH input during the periods L1a and L1b in the MSK modulation intervals indicated by the MSK area signal ARm. In the case shown in FIG. 15A, the L-integration balance determiner 41 outputs "+1" as a value indicating the direction for delaying the phase of the multiplication fundamental wave BW. Additionally, in the case shown in FIG. 15B, the L-integration balance determiner 41 outputs "0". In the case shown in FIG. 15C, the L-integration balance determiner 41 outputs "−1" as a value indicating the direction for advancing the phase of the multiplication fundamental wave BW.

The L-integration balance up/down counter 42 counts the values "+1", "0", and "−1" output from the L-integration balance determiner 41 in this manner.

The counter value holder 43 holds the counted values of the L-integration balance up/down counter 42 at the holding timing.

As described above, the L-integration balance up/down counter 42 and the counter value holder 43 are supplied with the reset signal and the hold signal from the detection bit counter 45, respectively, whereby the counted values of the level balance determination results for a predetermined number of times (n MSK modulation intervals) are held and output from the counter value holder 43.

For example, suppose n=8 and the detection bit counter 45 counts the value from "0" to "8". The value of the hold output from the counter value holder 43 may be one of values between "−9" and "+9".

The phase adjustment value decider 44 generates a phase adjustment value Pd on the basis of the hold output value from the counter value holder 43.

Various methods for calculating the phase adjustment value Pd can be considered. Three examples will be given here. Firstly, the hold output value is used as the phase adjustment value Pd. Secondly, if the hold output value is positive, the phase adjustment value Pd is set equal to "+1", whereas, if the hold output value is equal to 0 or negative, the phase adjustment value Pd is set equal to "0" and "−1", respectively. Thirdly, the hold output value is multiplied by a coefficient k, and the result is used as the phase adjustment value Pd. For example, the coefficient k is set equal to ¼ (the fractional part of the multiplication result may be rounded or discarded, for example).

For example, the phase determiner 27 generates the phase adjustment value Pd in such a manner. The phase adjustment value Pd is supplied to the up/down counter 28 shown in FIG. 9.

The up/down counter 28 counts the phase adjustment value Pd supplied from the phase determiner 27. More specifically, if the phase adjustment value Pd is positive, the up/down counter 28 counts up, whereas, if the phase adjustments value Pd is negative, the up/down counter 28 counts down. If the phase adjustment value Pd=0, the up/down counter 28 holds the counted value.

The counted value in the up/down counter 28 is supplied to the delay circuit 32 and the selector circuit 34 as the automatic phase control value Pc.

For example, the system controller 60 supplies an MSK phase initial value load signal Si to a terminal 36f, whereby the initial value of the up/down counter 28, namely, the initial value of the phase adjustment value, is set.

Figure 16:
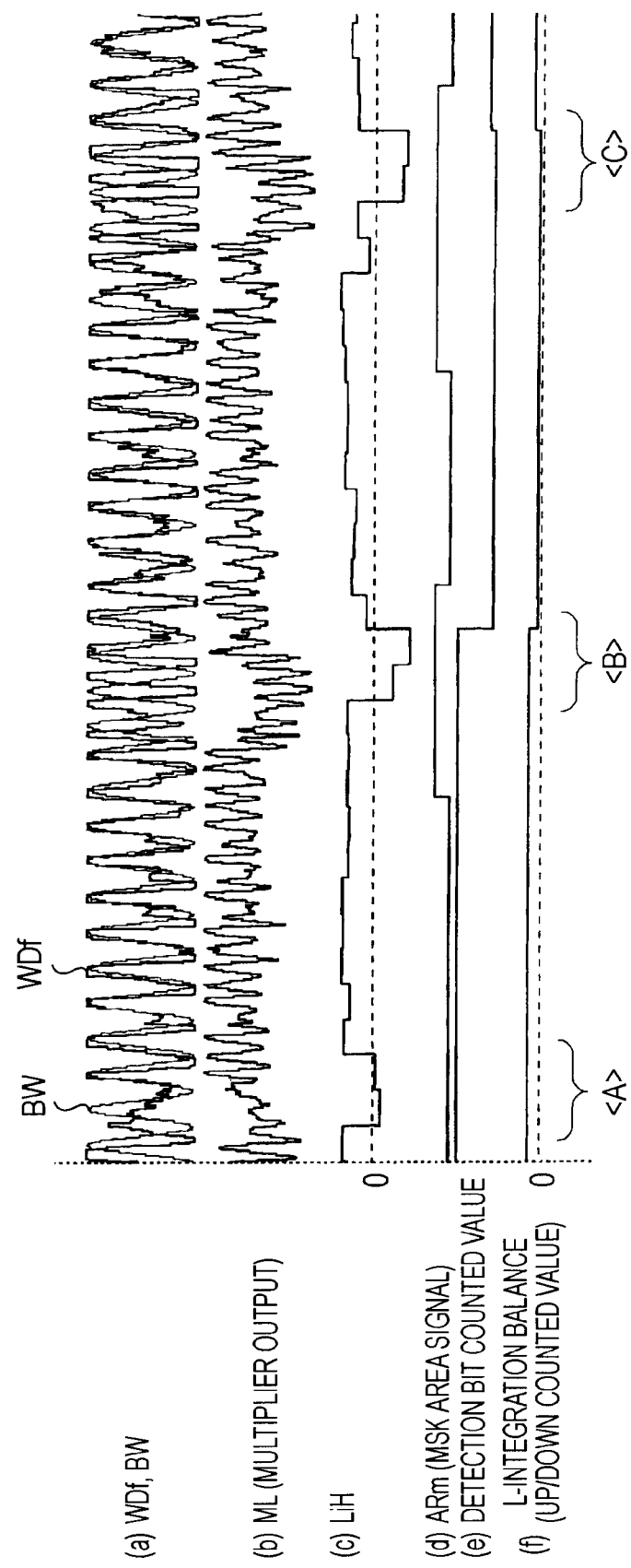
FIG. 16 is an explanatory diagram of signal waveforms for phase adjustment according to an embodiment of the present invention.
Figure 17:
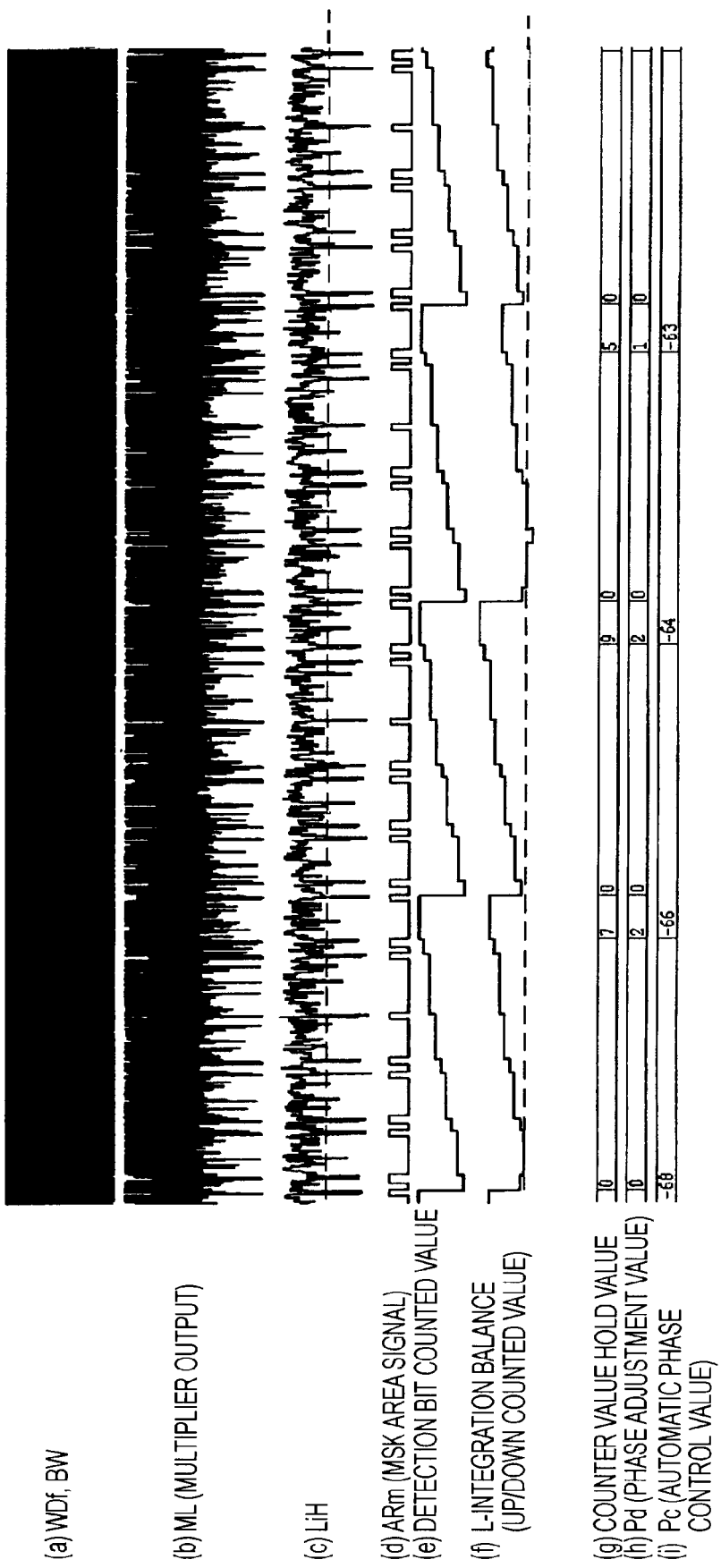
FIG. 17 is an explanatory diagram of signal waveforms for phase adjustment according to an embodiment of the present invention.

FIGS. 16 and 17 illustrate waveforms for the above-described described phase adjustment.

Waveforms (a) of FIG. 16 correspond to the wobble data WDf and the multiplication fundamental wave BW to be supplied to the multiplier 22. A waveform (b) of FIG. 16 corresponds to the multiplier output ML, obtained by multiplying the wobble data and the multiplication fundamental wave, from the multiplier 22.

The L-integrated value hold output LiH (c) of FIG. 16 is obtained by integrating the multiplier output ML by the L-integrator 23, and is supplied to the phase determiner 27.

The MSK area signal Arm, i.e., a waveform (d) of FIG. 16, is also supplied to the phase determiner 27.

In a case shown in this figure, during each of periods <A>, <B>, and <C>, the L-integrated value hold output LiH falls below the zero-level. The MSK area signal ARm indicates that the periods <B> and <C> correspond to the MSK modulation intervals. Thus, in the periods <B> and <C>, the L-integration balance determiner 41 of the phase determiner 27 determines the level balance of the L-integrated value hold output LiH for two L periods during which the output LiH falls below the zero-level. In the period <A>, the L-integrated value hold output LiH falls below the zero-level for some reason. However, since the period <A> is not the MSK modulation interval, the L-integration balance determiner 41 does not determine the level balance.

The L-integration balance up/down counter 42 counts up and down as shown by a waveform (f) in FIG. 16 on the basis of values (+1, 0, and −1) output as results of level balance determination by the L-integration balance determiner 41.

In this figure, the detection bit counted value shown as a waveform (e) in FIG. 16 is reset during the period <B>. The counted value of the L-integration balance up/down counter 42 shown as a waveform (f) in FIG. 16 is also reset at this time.

Waveforms (a) to (f) in FIG. 17 correspond to the waveforms (a) to (f) in FIG. 16 shown in a compressed time axis and shown for a longer period, respectively.

As is clear from the waveforms (d), (e), and (f) of FIG. 17, the level balance is determined in the MSK modulation intervals indicated by the MSK area signal ARm, and the L-integration balance up/down counter 42 counts the value. This figure shows a case where the value is counted up.

Additionally, as shown by the waveform (e) of FIG. 17, the detection bit counter 45 counts the MSK demodulated signal Dout. If the counted value becomes equal to "n", the counter value holder 43 holds the counted value. At time of next counting up, the counted values of the detection bit counter 45 and the L-integration balance up/down counter 42 are reset.

With this operation, the hold output value from the counter value holder 43 becomes as shown by the waveform (g) in FIG. 17. The phase adjustment value decider 44 generates the phase adjustment value Pd using this hold output value as shown by the waveform (h) in FIG. 17. This figure shows an example of the phase adjustment value Pd generated by multiplying the hold output value by a coefficient.

The up/down counter 28 counts the phase adjustment value Pd. The counted value of the up/down counter 28 is shown as the waveform (i) in FIG. 17. This value is supplied to the delay circuit 32 and the selector circuit 34 as the automatic phase control value Pc.

As described above, the delay circuit 32 sets the delay time in accordance with the most significant bits of the counted value (the automatic phase control value Pc) supplied from the up/down counter 28. In addition, the selector circuit 34 selects one of the tables TB0 to TB7 in accordance with the least significant bits of the counted value (the automatic phase control value Pc) supplied from the up/down counter 28. As described above, the phase of the multiplication fundamental wave BW can be adjusted in units of clock period of the master clock MCK by adjusting the delay time in the delay circuit 32. The phase of the fundamental wave BW can be adjusted in units of ⅛ of a clock period of the master clock MCK by selecting one of the tables TB0 to TB7 in the selector circuit 32.

The MSK demodulator 10 performs the automatic phase adjustment while monitoring the level balance of two L-integrated values (L-integrated value hold output LiH) in the MSK modulation interval to shift the phase of the multiplication fundamental wave BW to the optimum state.

As described above, the level balance of the L-integrated value hold output LiH corresponds to the cross-phase state. Thus, the direction of the phase shift and the shift amount can be determined by counting the level balance determination results for a predetermined number of times (n times). The up/down counter 28 counts the determination results, namely, the phase adjustment values Pd, and uses the counted value as the automatic phase control value Pc, whereby the delay time can be set and the table can selected in accordance with the phase shift direction of the multiplication fundamental wave BW and the shift amount. This allows optimization of the cross-phase state of the wobble data WDf and the multiplication fundamental wave BW to be input to the multiplier 22. As a result, the phase of the multiplication fundamental wave BW can be maintained optimally with respect to the phase of the wobble data WDf.

Automatically optimizing the cross-phase state of the multiplication fundamental wave BW and the wobble data WDf can improve the MSK demodulation performance.

More specifically, even if the phase shift occurs due to the disturbance, such as crosstalk between adjacent tracks on the disk 1, a drop in reflectivity subsequent to recording, disk skew, and different characteristics of media, the phase shift can be corrected and the MSK demodulation can be reliably performed, thus decreasing the ADIP address errors.

The decrease in the address errors enables reliable read and write operations to be performed on a read and write media having large variations in media characteristics due to different manufacturers.

An increase in the MSK demodulation performance can improve the production yield due to variations in characteristics of pickups.

In this embodiment, the phase adjustment is performed by not only the delay time in the delay circuit 32 but also the selection of the tables 35. Accordingly, the highly accurate phase adjustment can be automatically performed without increasing the sampling frequency (the frequency of the master clock MCK).

The accuracy (resolution) of the automatic adjustment in this embodiment depends on the frequency of the master clock MCK and the number of tables 35. Accordingly, these elements may be appropriately designed in consideration of the desired adjustment accuracy.

Furthermore, in this embodiment, the configuration of the MSK demodulator 10 is significantly simplified in comparison with the technique described in Japanese Unexamined Patent Application Publication No. 2006-12348.

More specifically, the technique described in Japanese Unexamined Patent Application Publication No. 2006-12348 uses three MSK demodulation systems for automatic phase adjustment. This embodiment eliminates the necessity. This realizes simplification and miniaturization of the circuit configuration and a reduction in costs.

A method for phase adjustment using a simple circuit configuration according to the embodiment realizes reliable phase adjustment not inferior to a known method, which will be described with reference to FIG. 18.

Figure 18:
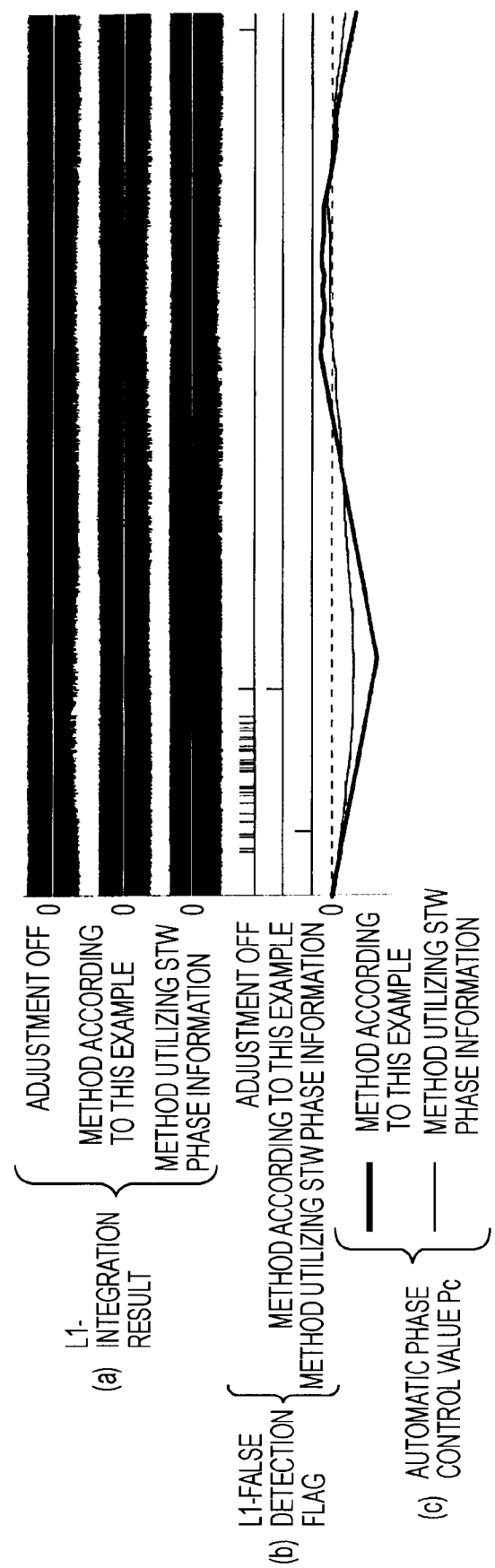
FIG. 18 is an explanatory diagram of a phase adjustment performance according to an embodiment of the present invention.

Waveforms (a) of FIG. 18 show Li-integration results, whereas waveforms (b) and (c) of FIG. 18 show Li-false detection flags and automatic phase control value Pc, respectively. The waveforms (a) and (b) of FIG. 18 correspond to a waveform not having undergone the phase adjustment, a waveform having undergone the phase adjustment according to this embodiment, and a waveform having undergone the phase adjustment using the phase information from an STW demodulator as described in Japanese Unexamined Patent Application Publication No. 2005-222608. The waveforms (c) of FIG. 18 shows the automatic phase control value Pc according to this embodiment and that according to the method allowing the phase adjustment using the phase information from the STW demodulator.

FIG. 18 shows that the wobble data and the multiplication fundamental wave BW substantially become in phase both in the method according to this embodiment and the method utilizing the phase information from the STW demodulator if the phase adjustment function is turned on in comparison with a state where the function is turned off. This improves a dent of the L1-integration results shown by the waveforms (a) of FIG. 18 to be more flat, and occurrence of the Li-false detection shown by the waveforms (b) of FIG. 18 is significantly reduced.

In addition, as shown by the waveforms (c) in FIG. 18, the method according to this embodiment allows phase tracking in the period curve as in the case of the phase adjustment method using the phase information from the STW demodulator.

That is, the method according to this embodiment provides advantages not inferior to those provided by the phase adjustment method using the phase information from the STW demodulator, thus realizing sufficient phase adjustment performance.

Furthermore, this embodiment allows reliable phase adjustment in areas on the disk 1 not including STW modulated signals.

That is, this embodiment overcomes the disadvantages of Japanese Unexamined Patent Application Publication Nos. 2005-222608 and 2006-12348, namely, a complex circuit configuration and incapability of phase adjustment in intervals not including STW modulated signals, and realizes reliable phase adjustment.

In addition, in this embodiment, the phase determiner 27 determines the level balance only for the MSK modulation intervals on the basis of the MSK area signal ARm, which makes the phase determination more accurate. More specifically, in intervals other than the MSK modulation intervals, namely, monotone intervals, the L-integrated value hold output LiH may fall below 0 for some reason. In such a case, the phase determiner 27 does not use the L-integrated value hold output LiH for the phase determination. Accordingly, the phase determination accuracy is not decreased.

4. Modifications

While the embodiments of the present invention have been described above, various modifications can be considered.

For example, the MSK demodulator 10 according to the embodiment can perform fine phase adjustment using the tables 35. However, the MSK demodulator 10 can be configured not to include tables.

Figure 19:
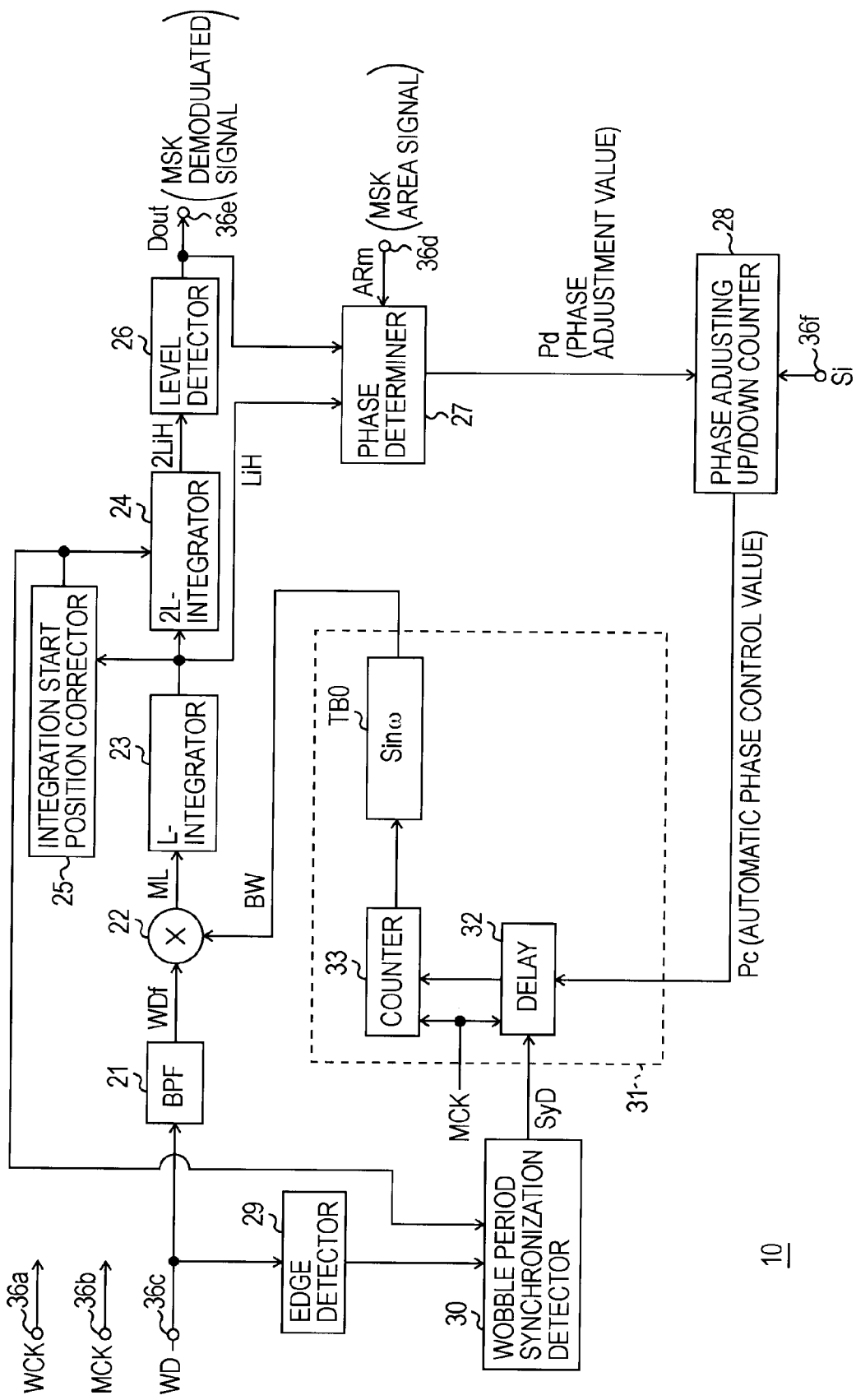
FIG. 19 is a block diagram of another configuration of an MSK demodulator according to an embodiment of the present invention.

In FIG. 19, parts similar to those shown in FIG. 9 are denoted by like numerals, and the detailed description thereof is omitted. An MSK demodulator 10 shown in FIG. 19 has only one table TB0 for generating a multiplication fundamental wave BW.

In this case, phase adjustment of the multiplication fundamental wave BW is achieved only by adjusting delay time in a delay circuit 32. Thus, a phase adjustment value is supplied only to the delay circuit 32 from a phase adjusting up/down counter 28.

It has been described that finer phase adjustment than in units of clock period of a master clock MCK can be performed by selecting one of the tables 35 in the configuration shown in FIG. 9. However, if the frequency of the master clock MCK can be sufficiently increased, fine phase adjustment can be achieved by the delay circuit 32 alone.

That is, when the operating frequency in the delay circuit 32 can be increased, the configuration shown in FIG. 19 enables reliable phase adjustment regarding its performance.

In addition, in the above-described embodiment, an example for adjusting the phase of the multiplication fundamental wave BW is given as a technique for adjusting the cross-phase state of the wobble data WDf and the multiplication fundamental wave BW. However, a technique for adjusting the phase of the wobble data WDf to be input to a multiplier 22 while fixing the phase of the multiplication fundamental wave BW can be also considered. For example, a delay circuit is provided between a bandpass filer 21 and the multiplier 22. The delay amount of the delay circuit may be set on the basis of an automatic phase control value Pc supplied from the up/down counter 28.

Furthermore, a circuit configuration for adjusting both of phases of the wobble data WDf and the multiplication fundamental wave BW can be also considered.

An example is given for the demodulator handles information of the wobbling groove on a phase change disk in the above-described embodiment. The embodiments of the present invention are applicable to the wobbling groove demodulation of disks that function in the pigment-layer change recording method, the magneto-optical recording method, and other recording methods.

In addition, demodulation methods described in the embodiments are applicable to various apparatuses. More specifically, the embodiments can be applied to wobble address demodulation of optical disks as described above and to signal transmission demodulation apparatuses or the like using MSK demodulation.

It should be understood by those skilled in the art that various modifications, combinations, sub-combinations and alterations may occur depending on design requirements and other factors insofar as they are within the scope of the appended claims or the equivalents thereof.

What is claimed is:

1. A demodulator for demodulating an input signal including a predetermined modulated signal, comprising:
    a multiplication fundamental wave generator for outputting a multiplication fundamental wave for the predetermined modulated signal;
    a calculator for multiplying the multiplication fundamental wave by the input signal and for integrating the multiplication result;
    a demodulated signal generator for generating a demodulated signal of the modulated signal using the output from the calculator;
    a phase determiner for determining a cross-phase state of the input signal and the multiplication fundamental wave on the basis of a balance of levels of an integrated value hold output, obtained as the integration result, for at least two successive intervals containing the modulated signal in the input signal; and
    a phase adjuster for adjusting a phase of the multiplication fundamental wave to be supplied to the calculator on the basis of the determination result of the phase determiner.

2. The demodulator according to claim 1, wherein the phase adjuster adjusts the phase of the multiplication fundamental wave on the basis of the determination result of the phase determiner so that the cross-phase state of the input signal and the multiplication fundamental wave to be multiplied by the calculator becomes optimum.

3. The demodulator according to claim 2, wherein the phase determiner increments and decrements, for each interval containing the modulated signal, a counted value of an up/down counter on the basis of a direction of a phase shift between the multiplication fundamental wave and the predetermined modulated signal determined from the level balance, and generates a phase adjustment value, as the determination result of the cross-phase state, using the counted value of the up/down counter obtained after counting is performed a predetermined number of times.

4. The demodulator according to claim 3, wherein the phase determiner is supplied with a modulation interval signal indicating an interval containing the modulated signal, and the phase determiner determines the direction of phase shift on the basis of the balance of levels of the plurality of integrated values only regarding the interval indicated by the modulation interval signal.

5. The demodulator according to claim 1, wherein the predetermined modulated signal is a signal modulated according to a minimum shift keying modulation method.

6. A disk drive device comprising:
    a reader for reading a wobble signal including a predetermined modulated signal recorded on a disk recording medium as a wobbling groove;
    a multiplication fundamental wave generator for outputting a multiplication fundamental wave for the predetermined modulated signal;
    a calculator for multiplying the multiplication fundamental wave by the input signal and for integrating the multiplication result;
    a demodulated signal generator for generating a demodulated signal of the modulated signal using the output from the calculator;
    a phase determiner for determining a cross-phase state of the input signal and the multiplication fundamental wave on the basis of a balance of levels of an integrated value hold output, obtained as the integration result, for at least two successive intervals containing the modulated signal in the wobble signal;
    a phase adjuster for adjusting a phase of the multiplication fundamental wave to be supplied to the calculator on the basis of the determination result of the phase determiner; and
    a decoder for decoding the demodulated signal provided by the demodulated signal generator and for obtaining information recorded as the wobbling groove.

7. The disk drive device according to claim 6, wherein the phase adjuster adjusts the phase of the multiplication fundamental wave so that the cross-phase state of the input signal and the multiplication fundamental wave to be multiplied by the calculator becomes optimum.

8. The disk drive device according to claim 6, wherein the decoder obtains address information on the disk recording medium as the information recorded as the wobbling groove.

9. A demodulation method for a demodulator for demodulating an input signal including a predetermined modulated signal, the method comprising:
    multiplying a multiplication fundamental wave by the input signal and integrating the multiplication result;
    generating a demodulated signal of the modulated signal using the output of the multiplying and integrating;
    determining a cross-phase state of the input signal and the multiplication fundamental wave on the basis of a balance of levels of an integrated value hold output, obtained as the integration result, for at least two successive intervals containing the modulated signal in the input signal; and
    adjusting a phase of the multiplication fundamental wave to be multiplied on the basis of the determination result of the phase determining.

10. A demodulation method for a demodulator for demodulating an input signal including a predetermined modulated signal, the method comprising:

multiplying a multiplication fundamental wave by the input signal and integrating the multiplication result;

generating a demodulated signal of the modulated signal using the output of the multiplying and integrating;

determining a cross-phase state of the input signal and the multiplication fundamental wave on the basis of a balance of levels of an integrated value hold output, obtained as the integration result, for at least two successive intervals containing the modulated signal in the input signal; and adjusting a phase of the multiplication fundamental wave on the basis of the determination result of the phase determining so that the cross-phase state of the input signal and the multiplication fundamental wave to be multiplied in the multiplying and integrating becomes optimum.

* * * * *